US011275995B2

(12) United States Patent
Tsukamoto et al.

(10) Patent No.: US 11,275,995 B2
(45) Date of Patent: Mar. 15, 2022

(54) INFORMATION PROCESSING APPARATUS, ISING DEVICE, AND CONTROL METHOD FOR INFORMATION PROCESSING APPARATUS

(71) Applicant: FUJITSU LIMITED, Kawasaki (JP)

(72) Inventors: Sanroku Tsukamoto, Setagaya (JP); Hirotaka Tamura, Yokohama (JP); Satoshi Matsubara, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 999 days.

(21) Appl. No.: 15/609,767

(22) Filed: May 31, 2017

(65) Prior Publication Data

US 2018/0018563 A1  Jan. 18, 2018

(30) Foreign Application Priority Data

Jul. 13, 2016  (JP) .............................. JP2016-138671

(51) Int. Cl.
*G06N 3/08* (2006.01)
*G06F 7/48* (2006.01)
(Continued)

(52) U.S. Cl.
CPC ................. *G06N 3/08* (2013.01); *G06F 7/48* (2013.01); *G06F 7/523* (2013.01); *G06N 3/04* (2013.01);
(Continued)

(58) Field of Classification Search
CPC ........ G06N 3/063; G06N 3/04; G06N 3/0445; G06N 3/0472; G06N 10/00; G06F 7/523; G06F 7/48; G06F 2207/4824
See application file for complete search history.

(56) References Cited

U.S. PATENT DOCUMENTS 5,170,463 A  12/1992  Fujimoto et al.

FOREIGN PATENT DOCUMENTS

| JP | 2-306365 | 12/1990 |
| JP | 5-250346 | 9/1993 |
| JP | 2001-250102 | 9/2001 |

OTHER PUBLICATIONS

Zhu et al. "Introducing a Parallel Transit Evalaution Method into the Sequential Boltzmann Machine," Electronics and Communications in Japan, Part 3, vol. 81, No. 12, 1998 (Year: 1998).*
(Continued)

*Primary Examiner* — Miranda M Huang
*Assistant Examiner* — Yao David Huang
(74) *Attorney, Agent, or Firm* — Fujitsu Patent Center

(57) ABSTRACT

An individual ising device connected to common buses includes neuron circuits, a memory, and a router. The memory holds connection destination information per neuron circuit. An individual item of connection destination information includes first address information identifying one of a plurality of connection destination neuron circuits of a neuron circuit and second address information identifying a first ising device including at least one of the connection destination neuron circuits, the first and second address information being correlated. The router supplies, when an output signal of a connection destination neuron circuit changes and when the router receives the first address information identifying this connection destination neuron circuit via a bus, an update signal based on the changed output signal to one of the neuron circuits in accordance with the received first address information, the previously specified second address information identifying the first ising device, and the connection destination information.

13 Claims, 12 Drawing Sheets

(51) Int. Cl.
  *G06N 3/04* (2006.01)
  *G06N 3/063* (2006.01)
  *G06F 7/523* (2006.01)
  *G06N 10/00* (2019.01)

(52) U.S. Cl.
  CPC ......... *G06N 3/0445* (2013.01); *G06N 3/0472* (2013.01); *G06N 3/063* (2013.01); *G06F 2207/4824* (2013.01); *G06N 10/00* (2019.01)

(56) References Cited

OTHER PUBLICATIONS

M. Skubiszewski, "An exact hardware implementation of the Boltzmann machine," [1992] Proceedings of the Fourth IEEE Symposium on Parallel and Distributed Processing, Arlington, TX, USA, 1992, pp. 107-110 (Year: 1992).*

Wang et al, "FPGA-based neuromorphic computing system with a scalable routing network," 2015 15th Non-Volatile Memory Technology Symposium (NVMTS), Beijing, 2015, pp. 1-4 (Year: 2015).*

S. Joshi, "Scalable event routing in hierarchical neural array architecture with global synaptic connectivity," 2010 12th International Workshop on Cellular Nanoscale Networks and their Applications (CNNA 2010), Berkeley, CA, 2010, pp. 1-6 (Year: 2010).*

Kim et al., "A Large-Scale Architecture for Restricted Boltzmann Machines," 2010 18th IEEE Annual International Symposium on Field-Programmable Custom Computing Machines, Charlotte, NC, USA, 2010, pp. 201-208) (Year: 2010).*

Han et al., "Learning both Weights and Connections for Efficient Neural Networks," arXiv:1506.02626v3 [cs.NE] Oct. 30, 2015 (Year: 2015).*

Mocanu et al., "A topological insight into restricted Boltzmann machines," arXiv:1604.05978v1 [cs.NE] Apr. 20, 2016 (Year: 2016).*

S. Carrillo et al., "Scalable Hierarchical Network-on-Chip Architecture for Spiking Neural Network Hardware Implementations," in IEEE Transactions on Parallel and Distributed Systems, vol. 24, No. 12, pp. 2451-2461, Dec. 2013, doi: 10.1109/TPDS.2012.289. (Year: 2013).*

C. R. Schneider et al., "Analog CMOS Deterministic Boltzmann Circuits", IEEE Journal of Solid-State Circuits, vol. 28, No. 8, Aug. 1993, pp. 907-914 (8 pages).

F. Belletti et al., "JANUS: an FPGA-based System for High Performance Scientific Computing", Feb. 12, 2013, pp. 1-12 (12 pages).

* cited by examiner

INFORMATION PROCESSING APPARATUS, ISING DEVICE, AND CONTROL METHOD FOR INFORMATION PROCESSING APPARATUS

CROSS-REFERENCE TO RELATED APPLICATION

This application is based upon and claims the benefit of priority of the prior Japanese Patent Application No. 2016-138671, filed on Jul. 13, 2016, the entire contents of which are incorporated herein by reference.

FIELD

The embodiments discussed herein relate to an information processing apparatus, an ising device, and a control method for an information processing apparatus.

BACKGROUND

Neumann computers are not very suitable for solving multivariable optimization problems. However, to solve these problems, there is a method which uses an ising device (also referred to as a Boltzmann machine) that uses an ising energy function. Such an ising device performs calculation by replacing a problem to be calculated with an ising model, which is a model representing the behavior of a ferromagnetic spin.

An ising device may be modeled by using a neural network, for example. In such cases, each of the units (bits) included in the ising device functions as a neuron that outputs 0 or 1 on the basis of the states of the other bits and weight values (also referred to as coupling coefficients) each of which indicates coupling strength with one of the other bits. For example, by performing simulated annealing, the ising device obtains, as a solution, a combination of bit states from which a minimum value of the above energy function (also referred to as a cost function, an objective function, etc.) is obtained.

In addition, there is a known technique for performing a large-scale operation. In this technique, a neural network is established by combining a plurality of chips or a plurality of processors with each other. One example of this technique is a method in which a neural network is established by allocating a plurality of kinds of virtual processors, such as virtual processors corresponding to neurons and virtual processors corresponding to synaptic connections, to a plurality of real processors. There is also a method in which a plurality of chips with different configurations are arranged in an array. Since the maximum number of neurons a neuron is connected to varies depending on where it is located, a chip having a different circuit configuration is used depending on whether it is located on the periphery of the array or inside the array.

Japanese Laid-open Patent Publication No. 2001-250102
Japanese Laid-open Patent Publication No. 5-250346
Japanese Laid-open Patent Publication No. 2-3 06365
C. R. Schneider and H. C. Card, "Analog CMOS Deterministic Boltzmann Circuits", Journal of Solid-State Circuits, pp. 907-914, 1993

However, these conventional techniques in which a neural network is established by connecting a plurality of chips or a plurality of processors with each other could complicate the wiring. In addition, these conventional techniques require much time and effort or many man-hours for preparing a plurality of kinds of processors or chips. Thus, it is difficult to realize hardware that calculates large-scale problems.

SUMMARY

According to one aspect, there is provided an information processing apparatus including: a plurality of ising devices connected to common buses; and a control device, wherein each of the plurality of ising devices includes: a plurality of neuron circuits, each of which calculates a first value based on a sum of values, each of which is obtained by multiplying an output signal of one of a plurality of connection destination neuron circuits by one of a plurality of weight values that indicate connection strength with the respective connection destination neuron circuits, outputs 0 or 1 in accordance with a result of comparison between a second value obtained by adding a noise value to the first value and a threshold, and updates, upon receiving an update signal when one of the output signals changes, the first value in accordance with the update signal, a memory that holds items of connection destination information for each of the plurality of neuron circuits, each of the items of connection destination information including an item of first address information identifying one of the plurality of connection destination neuron circuits and an item of second address information identifying, among the plurality of ising devices, a first ising device including at least one of the plurality of connection destination neuron circuits, the first and second address information being associated with each other, and a router that supplies, when a first output signal of a first connection destination neuron circuit among the plurality of connection destination neuron circuits that is included in the first ising device changes and when the router receives the first address information identifying the first connection destination neuron circuit via one of the buses, the update signal based on a value of the changed first output signal transmitted via one of the buses to one of the plurality of neuron circuits in accordance with the received first address information, previously specified second address information identifying the first ising device, and the connection destination information, and wherein the control device specifies the second address information identifying the first ising device including the first connection destination neuron circuit that allows change of the first output signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
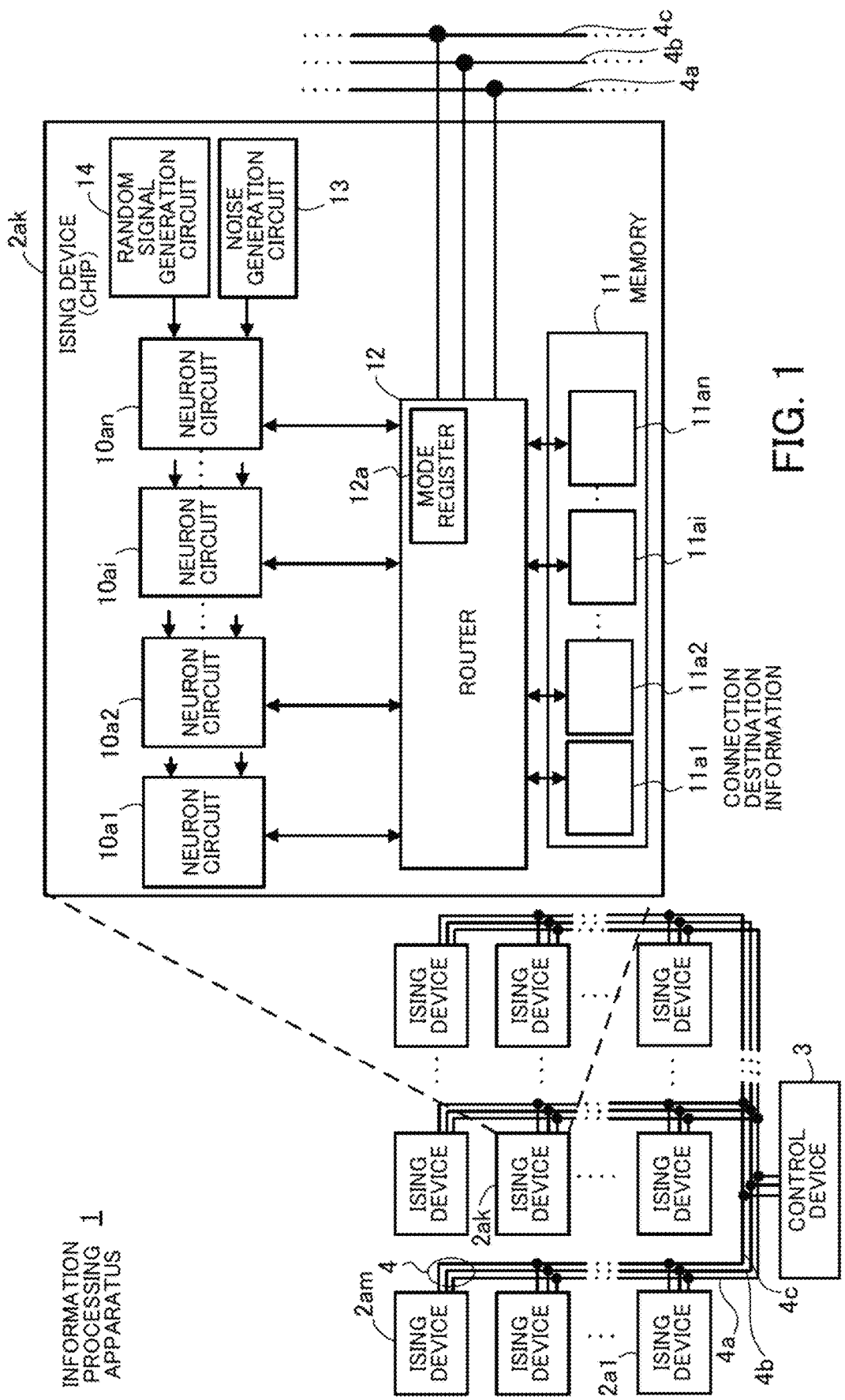
FIG. 1 illustrates an example of an information processing apparatus according to a first embodiment.

Hereinafter, embodiments will be described with reference to the accompanying drawings, wherein like reference characters refer to like elements throughout.

First Embodiment

FIG. 1 illustrates an example of an information processing apparatus 1 according to a first embodiment.

The information processing apparatus 1 includes plural (m) ising devices 2a1 to 2am and a control device 3.

For example, each of the ising devices 2a1 to 2am is realized by a single semiconductor integrated circuit (a chip). The ising devices 2a1 to 2am are connected to common buses 4. In the example in FIG. 1, the buses 4 include a data bus 4a, an address bus 4b, and a control bus 4c. Data is transmitted via the data bus 4a, and address information for identifying an individual neuron circuit is transmitted via the address bus 4b. In addition, address information for identifying, among the ising devices 2a1 to 2am, an ising device including a neuron circuit whose output signal is allowed to be changed is transmitted via the control bus 4c.

Each of the ising devices 2a1 to 2am includes the following elements. FIG. 1 illustrates, as an example, elements included in the ising device 2ak.

The ising device 2ak includes plural (n) neuron circuits 10a1, 10a2, . . . , 10ai, . . . , and 10an, a memory 11, a router 12, a noise generation circuit 13, and a random signal generation circuit 14.

Each of the neuron circuits 10a1 to 10an calculates a value (which will hereinafter be referred to as a local field value) based on a sum of values, each of which is obtained by multiplying an output signal of one of a plurality of connection destination neuron circuits by one of a plurality of weight values that indicate connection strength with the respective connection destination neuron circuits.

Next, each of the neuron circuits 10a1 to 10an outputs 0 or 1 on the basis of a result of comparison between a value obtained by adding a noise value to the corresponding local filed value and a threshold (for example, 0). In addition, each of the neuron circuits 10a1 to 10an updates, upon receiving an update signal when one of the output signals of the connection destination neuron circuits changes, the corresponding local field value on the basis of the update signal.

For example, the neuron circuits 10a1 to 10an are interconnected. At least one of the neuron circuits 10a1 to 10an is also connected to at least one neuron circuit included in at least one of the ising devices 2a1 to 2am other than the ising device 2ak.

Each of the neuron circuits 10a1 to 10an holds weight values that indicate connection strength with the corresponding connection destination neurons. For example, a storage unit (a register or a memory) included in each of the neuron circuits 10a1 to 10an holds weight values.

For example, in addition to the output signals of the neuron circuits 10a1 to 10an, the neuron circuit 10a1 receives the output signals of the corresponding connection destination neuron circuits included in one or more ising devices other than the ising device 2ak and calculates a sum of products, each of which is obtained by multiplying one of the output signal values of the connection destination neuron circuits by a corresponding weight value. In addition, the neuron circuit 10a1 adds a bias value to this sum to calculate the local field value. When a sum of the local field value and a noise value is smaller than the threshold (for example, 0), the neuron circuit 10a1 outputs 1. When the sum is equal to or more than the threshold, the neuron circuit 10a1 outputs 0.

These neuron circuits 10a1 to 10an enable hardware to carry out an operation of the ising energy function. For example, an ising energy function E(x) is defined by the following expression (1).

$$E(x) = -\sum_{\langle i,j \rangle} W_{ij} x_i x_j - \sum_i b_i x_i \qquad (1)$$

The first term on the right side of expression 1 is directed to all the combinations of two neuron circuits selectable from all the neuron circuits without missing any neuron circuit or redundantly counting any neuron circuit. More specifically, the first term represents the sum of products, each of which is obtained by multiplying output signal values of two neuron circuits by a corresponding weight value. In expression 1, $W_{ij}=W_{ji}$, and $W_{ii}=0$.

The second term on the right side of expression 1 represents the sum of products, each of which is obtained by multiplying a bias value of an individual one of the neuron circuits by an output signal value. In expression 1, $b_i$ represents the bias value of the neuron circuit 10ai.

In this ising energy function, when the output signal of a neuron circuit changes, the change of the energy value is determined by the weight values, each of which indicates strength between the neuron circuit and one of the other neuron circuits, and the output values of the individual neurons.

For example, when the output signal of the neuron circuit 10ai has changed, the change of the energy is expressed by the following expression (2).

$$\Delta E_i = (2x_i - 1) \cdot \left( \sum_j W_{ij} x_j + b_i \right) \qquad (2)$$

In expression (2), when a value $x_i$ (hereinafter referred to as a state), which is the value of the output signal of the neuron circuit 10ai, is 1, $2x_i-1$ is 1. In contrast, when the state $x_i$ is 0, $2x_i-1$ is $-1$. In addition, the local field value $h_i$ that indicates the energy generated by coupling of neuron circuits including the neuron circuit 10ai on the basis of expression (2) may be expressed by the following expression (3).

$$h_i = \sum_j W_{ij} x_j + b_i \qquad (3)$$

The first term on the right side of expression 3 represents the sum of products, each of which is obtained by multiplying a weight value representing connection strength between the neuron circuit $10ai$ and one of the connection destination neuron circuits of the neuron circuit $10ai$ by the state of that neuron circuit. These operations may be realized by using multiplier circuits, adder circuits, etc.

As is clear from expressions (2) and (3), when the local field value $h_i$ is negative and $2x_i-1$ is positive or when the local field value $h_i$ is positive and $2x_i-1$ is negative, $\Delta E_i$ is negative, i.e., the energy drops.

When the change of the state drops the energy, the neuron circuit $10ai$ outputs an updated state. This determination is realized by using a comparator circuit. A neuron circuit allowed to be updated is randomly selected from all the neuron circuits, and the same processing is repeatedly performed. In this way, the overall energy is dropped.

However, if a solution is obtained simply by searching for a combination of states of all the neuron circuits that drops energy, a solution may be constrained by a local solution, instead of an optimal solution. Namely, a solution is not able to shift from a local solution. Thus, a noise value (a random value) corresponding to a thermal noise is added to the local field value. In this way, a solution may shift to a solution having somewhat higher energy. Namely, a solution is able to shift from a local solution. By gradually dropping the noise width, a solution converges into an optimal solution.

As the neuron circuits $10a1$ to $10an$, circuits based on an algorithm called a DeGloria algorithm may be used. The DeGloria algorithm and an example of a circuit configuration of the neuron circuits $10a1$ to $10an$ will be described below with reference to FIGS. 3 and 10.

The memory 11 holds connection destination information $11a1$, $11a2$, ..., $11ai$, ..., and $11an$. In each of the items of connection destination information $11a1$ to $11an$, an item of address information identifying a connection destination neuron circuit is associated with an item of address information identifying an ising device including the connection destination neuron circuit. The items of connection destination information $11a1$ to $11an$ are stored to correspond to the respective neuron circuits $10a1$ to $10an$.

For example, in each of the items of connection destination information $11a1$, an item of address information identifying a connection destination neuron circuits connected to the neuron circuit $10a1$ is associated with an item of address information identifying an ising device including the connection destination neuron circuit.

In addition, in each of the items of connection destination information $11a1$ to $11an$, an item of identification information (which will hereinafter be referred to as a neuron index) identifying an individual connection destination neuron circuit used in the ising device $2ak$ may be associated with an item of address information identifying the individual connection destination neuron circuit.

Hereinafter, each item of address information identifying a connection destination neuron circuit will be referred to as an internal address, and each item of address information identifying an ising device will be referred to as a chip address. An internal address used in an ising device is address information that identifies a connection destination neuron circuit included in the ising device. For example, the control device 3 stores these internal addresses and chip addresses in advance in a register (not illustrated) (or the memory 11).

For example, a semiconductor storage device such as a flash memory may be used as the memory 11.

Among the plurality of connection destination neuron circuits, when the state of a connection destination neuron circuit included in an ising device (other than the ising device $2ak$) changes, the router 12 receives the internal address of the connection destination neuron circuit via the address bus $4b$. In addition, the router 12 receives the state of the connection destination neuron circuit via the data bus $4a$.

The router 12 supplies an update signal based on the changed state to one of the neuron circuits $10a1$ to $10an$ on the basis of the received internal address, the chip address of the ising device including the connection destination neuron circuit, and the connection destination information $11a1$ to $11an$. For example, the update signal is the changed state or the neuron index (when circuits based on an algorithm called a DeGloria algorithm are used) used for selecting weight values in the neuron circuits $10a1$ to $10an$.

The control device 3 previously specifies the chip address of the ising device including a connection destination neuron circuit whose state is allowed to be updated and supplies the chip address to the router 12 via the control bus $4c$. The chip address is stored in a storage unit in the router 12 (in the mode register $12a$ in the example in FIG. 1), for example.

For example, the router 12 compares the chip address and the internal address with the chip addresses and the internal addresses stored in the connection destination information $11a1$ to $11an$. For example, when these addresses are included in the connection destination information $11a1$ corresponding to the neuron circuit $10a1$, the router 12 supplies the changed (updated) state of the connection destination neuron circuit as an update signal to the neuron circuit $10a1$.

When any one of the states of the neuron circuits $10a1$ to $10an$ has changed, the router 12 outputs the changed state and the address (internal address) of the neuron circuit whose state has changed. The outputted internal address and state are transmitted to the other ising devices via the address bus $4b$ and the data bus $4a$.

In addition, the router 12 supplies the changed state of the neuron circuit whose state has changed among the neuron circuits $10a1$ to $10an$ and the corresponding neuron index to the other neuron circuits.

The router 12 that performs the above operation may be realized by comparator circuits, selection circuits, etc., for example.

The noise generation circuit 13 outputs a noise value for performing simulated annealing under control of the control device 3. The noise generation circuit 13 includes an amplifier circuit, for example. The control device 3 causes the noise generation circuit 13 to change the amplification factor of the amplifier circuit, to control the amplitude (the noise width) of the noise value. For example, the noise generation circuit 13 includes linear feedback shift registers (LFSRs).

The random signal generation circuit 14 outputs, a plurality of times, a random value for randomly selecting a single neuron circuit whose state is allowed to be updated from the n neuron circuits $10a1$ to $10an$. By allowing updating of the state of a single neuron circuit at a time, deterioration of the calculation convergence is prevented. For example, the random signal generation circuit 14 may also include LFSRs, as is the case with the noise generation circuit 13.

The control device 3 specifies the chip address of one of the ising devices $2a1$ to $2am$ that includes a neuron circuit whose state is allowed to be updated. For example, the control device 3 randomly selects one of the ising devices $2a1$ to $2am$ and supplies the chip address of the selected ising device to the control bus 4c. The chip address is transmitted via the control bus 4c and captured by the ising devices 2a1 to 2am.

In addition, to perform simulated annealing, the control device 3 causes the noise generation circuit 13 to gradually drop the noise width of the noise value.

In addition, the control device 3 sets weight values and bias values in each of the neuron circuits in the ising devices 2a1 to 2am on the basis of the problem to be calculated. For example, the control device 3 writes these weight values and bias values in memories or registers in the respective neuron circuits.

For example, the control device 3 that performs the above operation may be realized by a processor. Examples of the processor include a central processing unit (CPU), a micro processing unit (MPU), a digital signal processor (DSP), an application specific integrated circuit (ASIC), and a programmable logic device (PLD). The processor may be a combination of at least two of a CPU, an MPU, a DSP, an ASIC, and a PLD. The control device 3 may be a personal computer (PC).

For example, when the control device 3 is a processor, a non-volatile storage device that holds an operating system (OS), middleware, software programs such as application software programs, and data executed by the processor may be arranged. For example, a flash memory, a solid state drive (SSD), or a hard disk drive (HDD) may be used as the non-volatile storage device.

(Operation Example of Information Processing Apparatus 1)

Hereinafter, an operation example of the information processing apparatus 1 controlled by the control device 3 will be described.

The control device 3 sets weight values and bias values in all the neuron circuits in the ising devices 2a1 to 2am on the basis of the problem to be calculated. For example, the control device 3 sets weight values such that the n neuron circuits (for example, the neuron circuits 10a1 to 10an) are connected to each other in each of the ising devices 2a1 to 2am.

However, the control device 3 does not always need to set weight values such that the n neuron circuits (for example, the neuron circuits 10a1 to 10an) are connected to each other in each of the ising devices 2a1 to 2am. This is because, when problem mapping (setting of the weight values=programming) is performed, in many cases, programming is successfully performed without setting the weight values such that all neuron circuits are connected to each other.

For example, when the control device 3 writes weight values in the neuron circuits 10a1 to 10an in the ising device 2ak, the control device 3 supplies the weight values to the data bus 4a and supplies the chip address of the ising device 2ak to the control bus 4c. In addition, for example, the control device 3 brings the logic level of a write enable signal transmitted via the control bus 4c to an H (High) level.

When the router 12 receives the write enable signal, the router 12 compares the chip address transmitted via the control bus 4c with the chip address of the ising device 2ak. If the two chip addresses match, the router 12 captures the weight values transmitted via the data bus 4a and writes the captured weight values in the neuron circuits 10a1 to 10an.

The control device 3 writes the bias values in the neuron circuits 10a1 to 10an in the same way. The control device 3 also writes the connection destination information 11a1 to 11an in the memory 11 in the same way.

In addition, the control device 3 sets initial values of the states of all the neuron circuits. For example, as in the processing for writing the weight values, the control device 3 writes initial values in registers that are included in the respective neuron circuits and that hold the states of the respective neuron circuits.

Next, the control device 3 specifies the chip address of an ising device including a neuron circuit whose state is allowed to be updated. The ising devices 2a1 to 2am capture the specified chip address via the control bus 4c. Namely, the same chip address is set in the ising devices 2a1 to 2am.

Hereinafter, an operation example of the ising device 2ak will be described, assuming that the control device 3 has specified the chip address of the ising device 2a1.

When the router 12 of the ising device 2ak receives the chip address of the ising device 2a1, the router 12 stores the chip address in the mode register 12a. Next, when the state of a single neuron circuit in the ising device 2a1 is updated, the router 12 receives the internal address of the neuron circuit outputted by the ising device 2a1 and transmitted via the address bus 4b.

Next, on the basis of the chip address stored in the mode register 12a, the received internal address, and the connection destination information 11a1 to 11an, the router 12 determines whether the neuron circuit is connected to any of the neuron circuits 10a1 to 10an.

For example, when the connection destination information 11a1 holds information indicating that the neuron circuit whose state has been updated is connected to the neuron circuit 10a1, the router 12 receives the changed (updated) state of the neuron circuit in the ising device 2a1, the state having been transmitted via the data bus 4a. Next, the router 12 supplies an updated signal based on the changed state to the neuron circuit 10a1.

In this way, the neuron circuit 10a1 is able to perform updating on the basis of the updated signal.

As described above, each of the ising devices 2a1 to 2am in the information processing apparatus 1 according to the first embodiment is able to reflect the received changed state of a neuron circuit in another ising device on its own neuron circuits on the basis of the corresponding connection destination information. As a result, the inter-neuron-circuit connection number is increased, and a large-scale operation is performed.

For example, while it is difficult to cause integrated circuits on a single chip to calculate an optimization problem in which $10^3$ to $10^6$ or more variables are used, since the information processing apparatus 1 is able to function as a single ising device by using many chips, the information processing apparatus 1 is able to perform such a calculation easily.

In addition, the ising devices 2a1 to 2am may be realized by the same circuit configuration. Namely, different kinds of chips do not need to be prepared. In addition, since the ising devices 2a1 to 2am are connected to the common buses 4, complex wiring is not needed, which would otherwise be needed by a configuration in which a plurality of neuron circuits are connected to each other by wiring between two different ising devices. In addition, an inter-neuron connection may be changed simply by changing relevant connection destination information.

Figure 2:
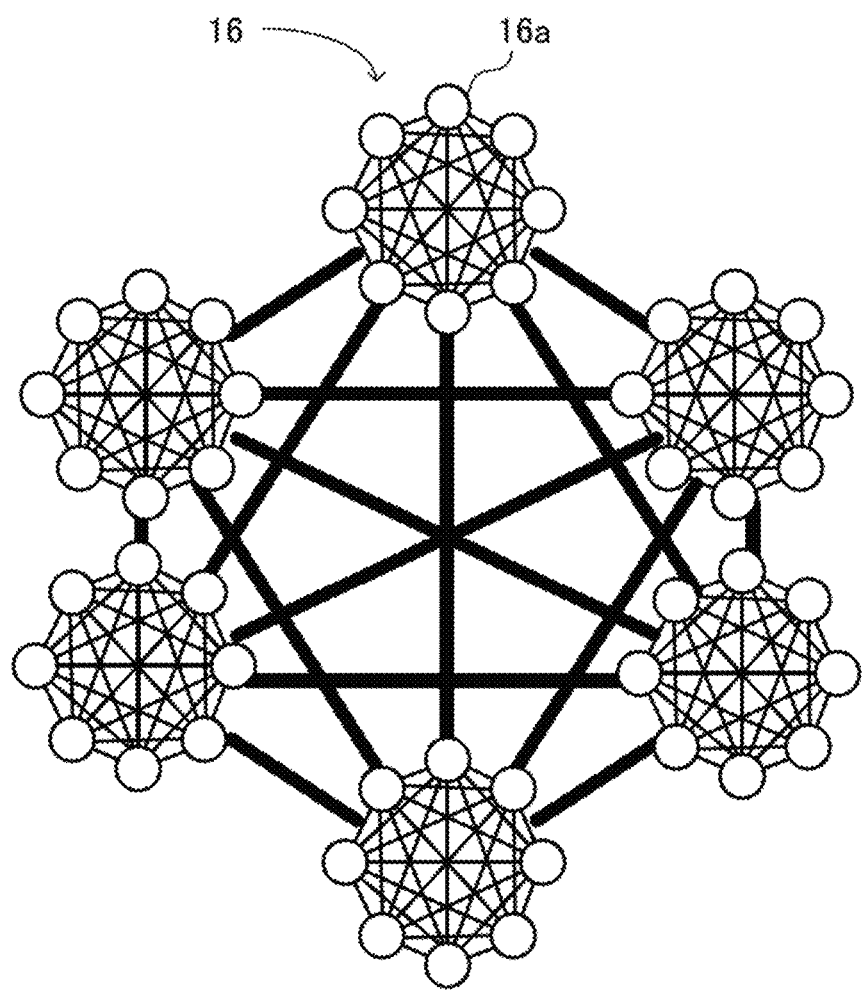
FIG. 2 is a conceptual diagram of a neural network realized by the information processing apparatus according to the first embodiment.

FIG. 2 is a conceptual diagram of a neural network realized by the information processing apparatus according to the first embodiment.

In the example in FIG. 2, a neural network is illustrated in which six neuron units (for example, neuron units 16) are connected to each other. In each of the neuron units, eight neurons (for example, neurons 16a) are connected to each other.

A single neuron unit corresponds to a single ising device (a chip), and a single neuron corresponds to a single neuron circuit.

The number of connections among the neuron units could be a constraint when a problem is mapped (setting of the weight values=programming). However, assuming that the number of neurons is 1,024, in many cases, programming is successfully performed without problem if the number of connections among the neuron units is about $\frac{1}{10}$ of the number of connections in the neuron units.

For example, if the number of connections among the neuron units is 128, namely, if an individual neuron is connectable to 128 neurons in the other neuron units, the number of weight values that need to be prepared in one neuron unit is $1024^2+1024\times128$. For example, when the number of neuron units is 4 and when 1024×4 neurons are connected to each other, the number of weight values is about $4.52\times10^6$. Thus, by limiting the number of connections among the neuron units, the number of weight values that need to be prepared may be reduced. Namely, by reducing the number of weight values stored in the registers or the like in the neuron circuits 10a1 to 10an according to the first embodiment, the circuit scale may be reduced.

Second Embodiment

Figure 3:
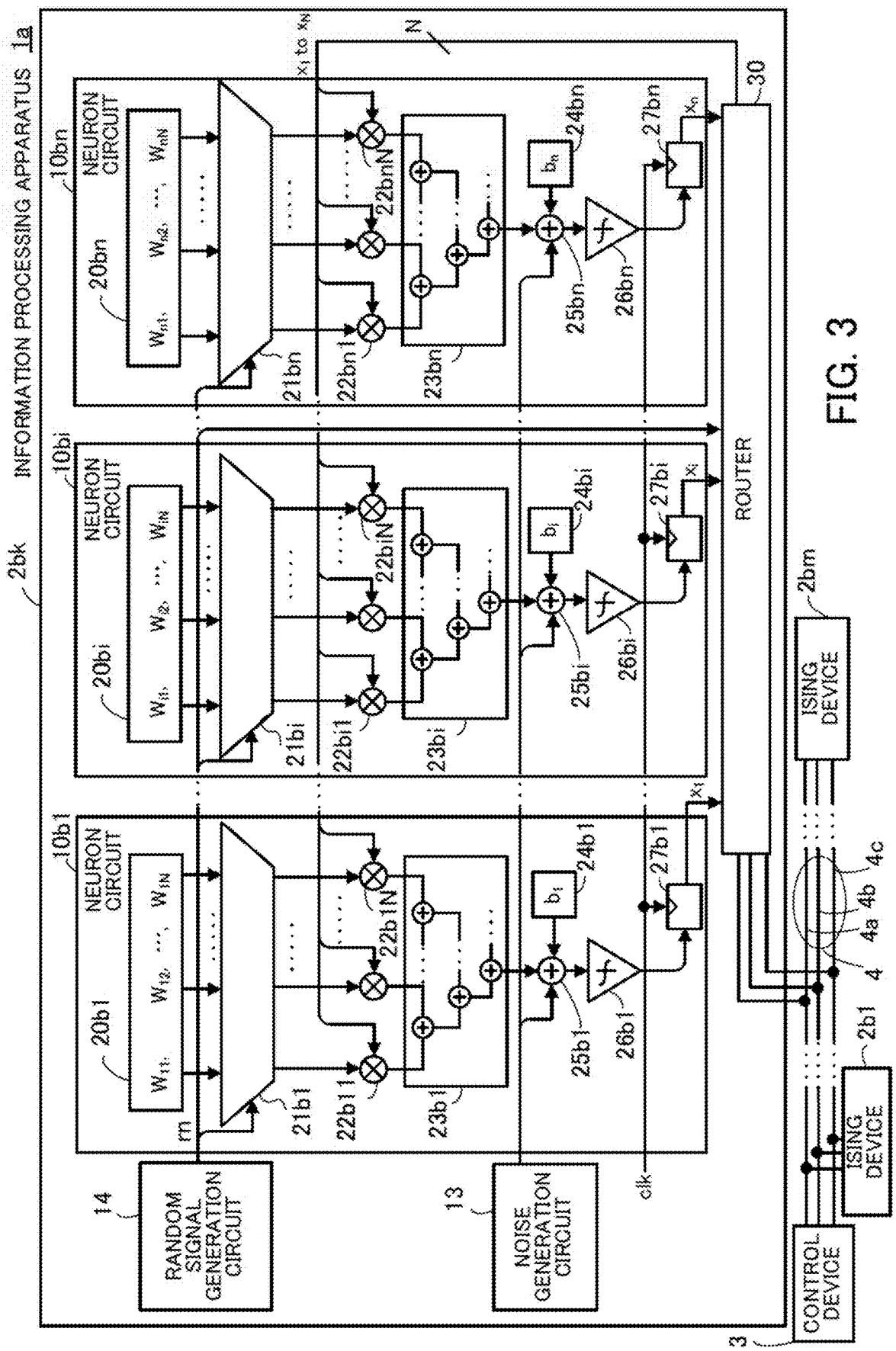
FIG. 3 illustrates an example of an information processing apparatus according to a second embodiment.

FIG. 3 illustrates an example of an information processing apparatus 1a according to a second embodiment. In FIG. 3, the elements in the information processing apparatus 1a that are equivalent to those in the information processing apparatus 1 according to the first embodiment are denoted by like reference characters.

The information processing apparatus 1a according to the second embodiment includes plural (m) ising devices 2b1 to 2bm and a control device 3.

For example, each of the ising devices 2b1 to 2bm is realized by a single semiconductor integrated circuit (a chip). The ising devices 2b1 to 2bm are connected to common buses 4. The buses 4 include a data bus 4a, an address bus 4b, and a control bus 4c.

Each of the ising devices 2b1 to 2bm includes the following elements. FIG. 3 illustrates, as an example, elements included in the ising device 2bk.

The ising device 2bk includes plural (n) neuron circuits 10b1, . . . , 10bi, . . . , and 10bn, a noise generation circuit 13, a random signal generation circuit 14, and a router 30.

The neuron circuits 10b1 to 10bn correspond to the neuron circuits 10a1 to 10an in the ising device 2ak according to the first embodiment. The router 30 corresponds to the router 12 in the ising device 2ak according to the first embodiment. The ising device 2bk according to the second embodiment will be described, assuming that an element corresponding to the memory 11 according to the first embodiment is included in the router 30, as will be described below.

Among the neuron circuits 10b1 to 10bn, only the neuron circuits 10b1, 10bi, and 10bn are illustrated in FIG. 3 as an example. Among the neuron circuits 10b1 to 10bn, the neuron circuits other than the neuron circuits 10b1, 10bi, and 10bn are also configured in the same way.

The neuron circuit 10b1 includes a register 20b1, a selection circuit 21b1, multiplier circuits 22b11 to 22b1N, an adder unit 23b1, a register 24b1, an adder circuit 25b1, a comparator circuit 26b1, and a flip flop 27b1. Likewise, the neuron circuit 10bi includes a register 20bi, a selection circuit 21bi, multiplier circuits 22bi1 to 22biN, an adder unit 23bi, a register 24bi, an adder circuit 25bi, a comparator circuit 26bi, and a flip flop 27bi. Likewise, the neuron circuit 10bn includes a register 20bn, a selection circuit 21bn, multiplier circuits 22bn1 to 22bnN, an adder unit 23bn, a register 24bn, an adder circuit 25bn, a comparator circuit 26bn, and a flip flop 27bn.

Each of the registers 20b1, 20bi, and 20bn holds N weight values. The registers 20b1 holds weight values $W_{11}$ to $W_{1N}$. The registers 20bi holds weight values $W_{i1}$ to $W_{iN}$. The registers 20bn holds weight values $W_{n1}$ to $W_{nN}$. Each of the neuron circuits 10b1, 10bi, and 10bn is connected to N-n neuron circuits included in the ising devices other than the ising device 2bk.

For example, among the weight values $W_{i1}$ to $W_{iN}$ stored in the registers 20bi, each of the weight values $W_{i1}$ to $W_{in}$ indicates connection strength between the neuron circuit 10bi and one of the neuron circuits in the ising device 2bk.

In contrast, among the weight values $W_{i1}$ to $W_{iN}$, each of the weight values $W_{in+1}$ to $W_{iN}$ indicates connection strength between the neuron circuit 10bi and one of the N-n neuron circuits included in one or more ising devices other than the ising device 2bk.

For example, when n=1,024 and N=1,152, the neuron circuit 10bi is connected to 128 neuron circuits included in the ising devices other than the ising device 2bk. Namely, the neuron circuit 10bi is connected to more neuron circuits included in the ising device 2bk than those included in the other ising devices. This is because, as described above, many problems may be mapped in the ising devices 2b1 to 2bm without interconnecting all the neuron circuits in the information processing apparatus 1a.

Needless to say, the numbers n and N are not limited to the above examples. The number N may be set so that all the neuron circuits outside the ising device 2bk are used as the connection destination neuron circuits of the neuron circuits 10b1 to 10bn.

The control device 3 sets the above weight values on the basis of the problem to be calculated and writes the weight values in the registers 20b1 to 20bn. The above weight values may previously be stored in a memory such as a random access memory (RAM).

Each of the neuron circuits 10b1 to 10bn uses the corresponding weight values to calculate a local field value as expressed by expression (3). In addition, each of the neuron circuits 10b1 to 10bn adds a noise value to the corresponding local field value, compares the sum with a threshold, and outputs the comparison result.

Among the neuron circuits 10b1 to 10bn, a neuron circuit whose state is allowed to be updated is randomly determined by a random value rn outputted by the random signal generation circuit 14. For example, the random value rn is a natural number (1<rn<n) and corresponds to one of the internal addresses of the neuron circuits 10b1 to 10bn. The random signal generation circuit 14 supplies the random value rn to the selection circuits 21b1 to 21bn in the neuron circuits 10b1 to 10bn as a selection signal. Next, on the basis of the random value rn, one of the selection circuits 21b1 to 21bn outputs weight values. In this way, a neuron circuit whose state is allowed to be updated is determined.

For example, the control device 3 controls the random signal generation circuit 14. When the ising device 2bk is set as an ising device including a neuron circuit whose state is not allowed to be updated (this is determined on the basis of the chip addresses stored in the corresponding mode register), the random value rn is not outputted. Thus, none of the selection circuits 21*b*1 to 21*bn* outputs weight values.

The following description will be based on an example in which the random value rn allows updating of the state of the neuron circuit 10*bi*.

The selection circuit 21*bi* outputs the weight values $W_{i1}$ to $W_{iN}$ stored in the registers 20*bi*.

Each of the multiplier circuits 22*bi*1 to 22*bi*N outputs a product of one of the states $x_1$ to $x_N$ of the N neuron circuits supplied by the router 30 as an update signal and one of the weight values $W_{i1}$ to $W_{iN}$ that corresponds to the state.

For example, the multiplier circuit 22*bi*1 outputs a product of the state $x_1$ and the weight value $W_{i1}$, and the multiplier circuit 22*bi*N outputs a product of the state $x_N$ and the weight value $W_{iN}$.

Among the states $x_1$ to $x_N$, the states $x_1$ to $x_n$ indicate the states of the neuron circuits 10*b*1 to 10*bn* included in the ising device 2*bk*. In addition, among the states $x_1$ to $x_N$, the states $x_{n+1}$ to $x_N$ indicate the states of the N-n neuron circuits included in one or more ising devices other than the ising device 2*bk* among the ising devices 2*b*1 to 2*bm*. The states $x_{n+1}$ to $x_N$ may be acquired by a function of the router 30 described below.

The adder unit 23*bi* outputs a sum of the values outputted by the multiplier circuits 22*bi*1 to 22*bi*N.

The registers 24*bi* holds a bias value $b_i$. The control device 3 writes the bias value $b_i$ in the register 24*bi* in advance.

The adder circuit 25*bi* outputs a sum of the value outputted by the adder unit 23*bi*, the noise value outputted by the noise generation circuit 13, and the bias value $b_i$. A sum of the value outputted by the adder unit 23*bi* and the bias value $b_i$ is the above local field value $h_i$.

The comparator circuit 26*bi* compares the value outputted by the adder circuit 25*bi* with a threshold (for example, 0) and outputs the comparison result.

The flip flop 27*bi* captures the comparison result outputted by the comparator circuit 26*bi* in synchronization with a clock signal clk and outputs the comparison result as the state $x_i$. For example, the clock signal clk is supplied by a clock signal generation circuit (not illustrated). All the ising devices 2*b*1 to 2*bm* use this clock signal clk.

(Example of Router 30)

Figure 4:
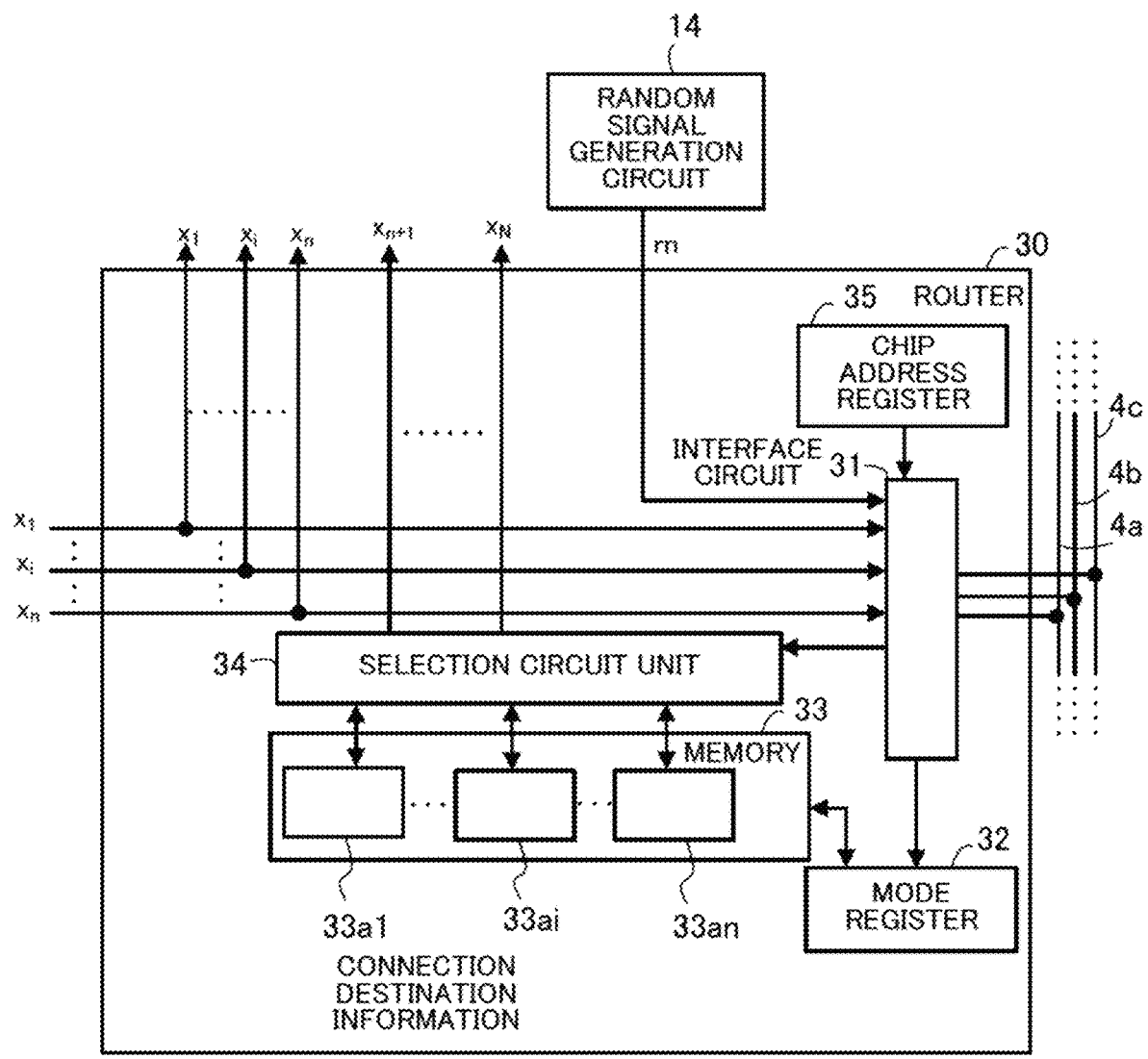
FIG. 4 illustrates an example of a router.

FIG. 4 illustrates an example of the router 30.

The router 30 includes an interface circuit 31, a mode register 32, a memory 33, a selection circuit unit 34, and a chip address register 35.

The interface circuit 31 is connected to the data bus 4*a*, the address bus 4*b*, and the control bus 4*c* and exchanges information between various elements in the ising device 2*bk* and the data bus 4*a*, the address bus 4*b*, and the control bus 4*c*.

The mode register 32 holds the chip address of one of the ising devices 2*b*1 to 2*bm*. This ising device includes a neuron circuit whose state is allowed to be updated. The chip address is specified by the control device 3 and transmitted via the control bus 4*c*. The interface circuit 31 acquires and supplies this chip address to the mode register 32.

Hereinafter, the ising device corresponding to the chip address set (stored) in the mode register 32 will be referred to as being in a talk mode, and the other ising device will be referred to as being in a listen mode.

The memory 33 holds items of connection destination information 33*a*1, . . . , 33*ai*, . . . , and 33*an*. The items of connection destination information 33*a*1 to 33*an* are stored to correspond to the respective neuron circuits 10*b*1 to 10*bn*.

In the connection destination information 33*a*1 to 33*an*, the internal addresses of the connection destination neuron circuits of the neuron circuits 10*b*1 to 10*bn* are associated with the chip addresses of the ising devices including the connection destination neuron circuits. In addition, in the connection destination information 33*a*1 to 33*an*, the neuron indexes, which are identification information about the connection destination neuron circuits used in the ising device 2*bk*, are associated with the internal addresses of the connection destination neuron circuits.

For example, in the connection destination information 33*a*1, the internal addresses of the connection destination neuron circuits connected to the neuron circuit 10*b*1 are associated with the chip addresses of the ising devices including the connection destination neuron circuits and the corresponding neuron indexes.

By using these neuron indexes, the states of the connection destination neuron circuits in the other ising devices may also be handled in the same way as the states of the neuron circuits 10*b*1 to 10*bn* in the ising device 2*bk*.

After the chip address is set in the mode register 32, the internal addresses associated with the chip addresses in the connection destination information 33*a*1 to 33*an* and the neuron indexes are read from the memory 33.

For example, a semiconductor storage device such as a flash memory may be used as the memory 33.

The selection circuit unit 34 performs the following operation when the ising device 2*bk* is in the listen mode. When the internal address that the interface circuit 31 has received via the address bus 4*b* matches any one of the internal addresses read from the memory 33, the selection circuit unit 34 captures the state of the connection destination neuron circuit that the interface circuit 31 has received via the data bus 4*a*. Next, the selection circuit unit 34 updates the states $x_{n+1}$ to $x_N$ on the basis of the change of the state.

The chip address register 35 holds the chip address of the ising device 2*bk*.

Figure 5:
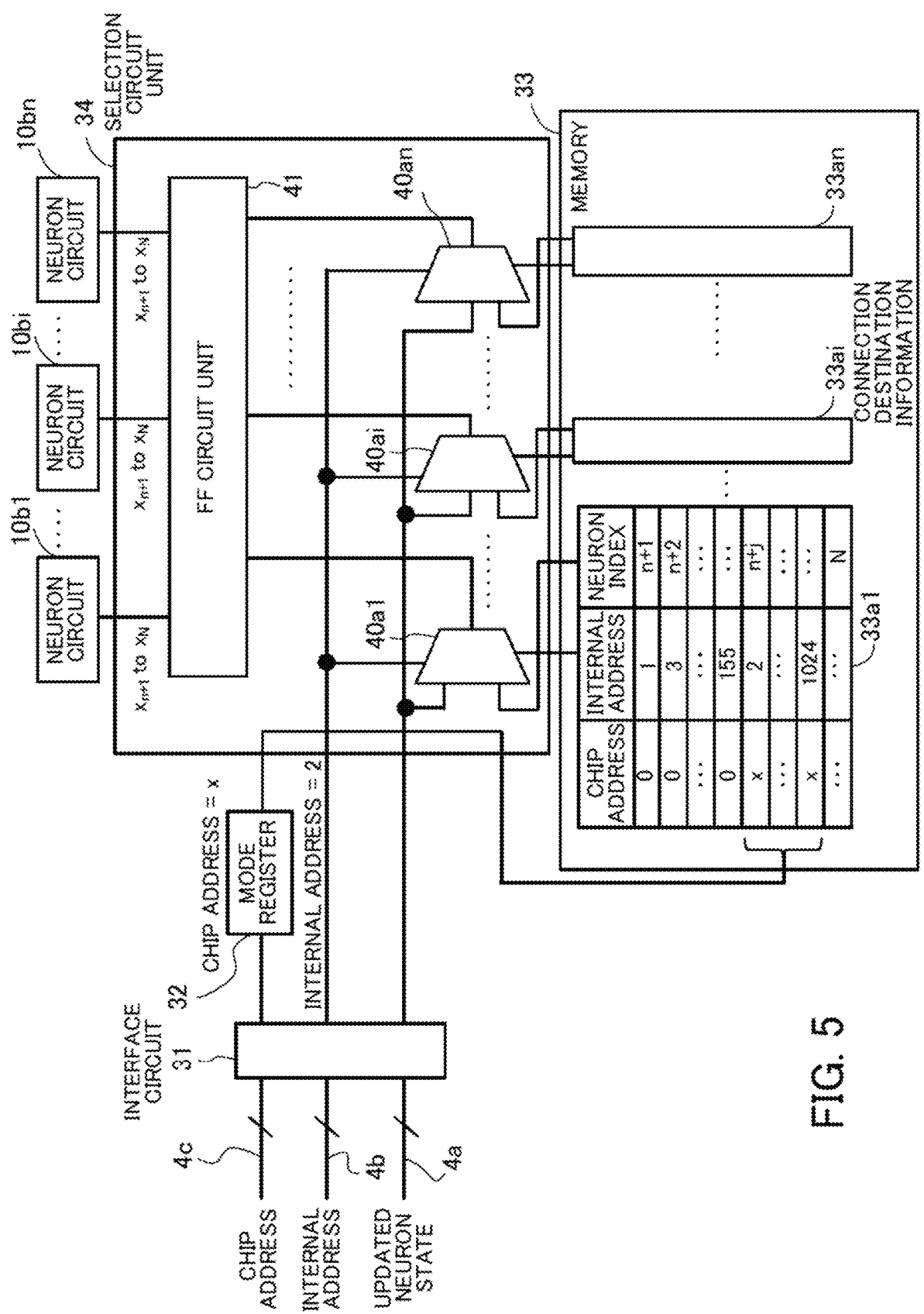
FIG. 5 illustrates an example of a selection circuit unit and of connection destination information.

FIG. 5 illustrates an example of a selection circuit unit and of connection destination information.

The selection circuit unit 34 includes selection circuits 40*a*1, . . . , 40*ai*, . . . , and 40*an* and an FF circuit unit 41.

Each of the selection circuits 40*a*1 to 40*an* compares the internal address that the interface circuit 31 has received and the internal address read from the memory 33. When the two addresses match, each of the selection circuits 40*a*1 to 40*an* outputs the state of the connection destination neuron circuit that the interface circuit 31 has received via the data bus 4*a* and the neuron index associated with the internal address.

For example, the following description assumes that the memory 33 holds the connection destination information 33*a*1 as illustrated in FIG. 5. Neuron circuits whose internal address is 2 to 1024 included in an ising device whose chip address is x are registered in the connection destination information 33*a*1 as connection destination neuron circuits of the neuron circuit 10*b*1. When x is set (stored) as the chip address in the mode register 32, the internal addresses associated with the chip address and the neuron indexes are read from the memory 33.

For example, when the internal address received by the interface circuit 31 is 2, the internal address matches one of the internal addresses read from the memory 33. Thus, the selection circuit 40*a*1 outputs the value of the output signal of the connection destination neuron circuit that the interface circuit 31 has received via the data bus 4*a* and n+j, which is the neuron index associated with the matching internal address.

The FF circuit unit 41 updates the states $x_{n+1}$ to $x_N$ supplied to the neuron circuits 10b1 to 10bn on the basis of the state of the connection destination neuron circuit outputted by the selection circuits 40a1 to 40an and the neuron index.

Figure 6:
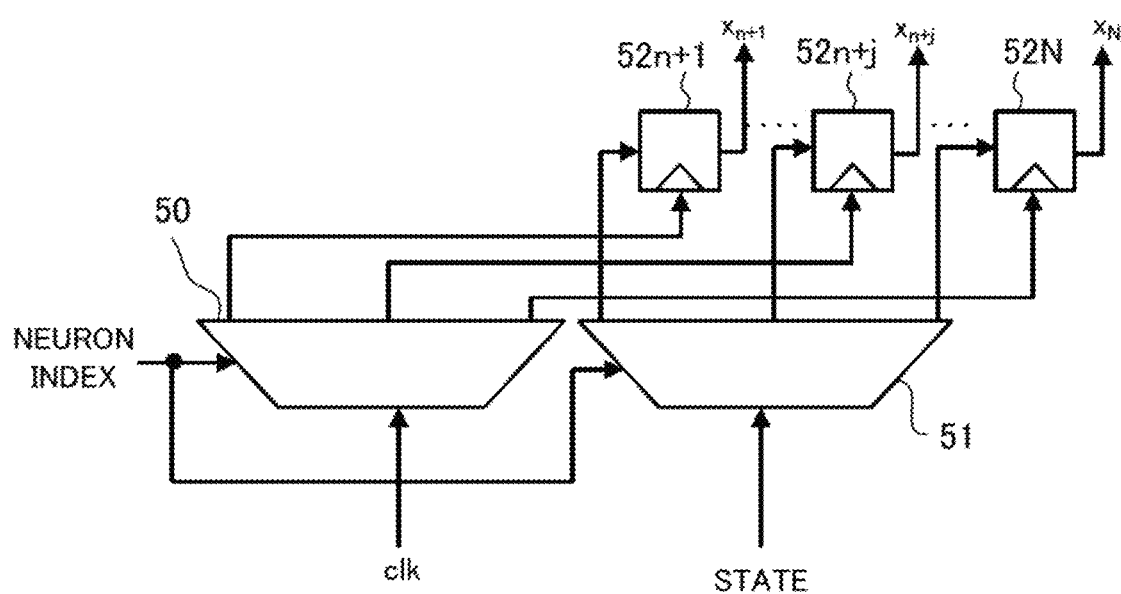
FIG. 6 illustrates a part of an FF circuit unit.

FIG. 6 illustrates a part of the FF circuit unit 41.

The FF circuit unit 41 includes selection circuits 50 and 51 and flip flop 52n+1, . . . , 52n+j, . . . , and 52N. These elements are arranged to correspond to each of the neuron circuits 10b1 to 10bn. The following description assumes that the selection circuits 50 and 51 and the flip flop 52n+1 to 52N are elements arranged for the neuron circuit 10b1.

The selection circuit 50 supplies a clock signal clk to one of the flip flops 52n+1 to 52N on the basis of the neuron index outputted by the selection circuit 40a1 illustrated in FIG. 5.

The selection circuit 51 supplies the state of the connection destination neuron circuit outputted by the selection circuit 40a1 to one of the flip flops 52n+1 to 52N on the basis of the neuron index outputted by the selection circuit 40a1 illustrated in FIG. 5.

The flip flops 52n+1 to 52N hold the states $x_{n+1}$ to $x_N$ and supply the states $x_{n+1}$ to $x_N$ to the neuron circuit 10b1.

For example, when the neuron index outputted by the selection circuit 40a1 is n+j, the selection circuit 50 supplies the clock signal clk to the flip flop 52n+j, and the selection circuit 51 supplies the neuron state to the flip flop 52n+j. In this way, in synchronization with the clock signal clk, the state $x_{n+j}$, which is the output of the flip flop 52n+j, is updated.

When the state of a connection destination neuron circuit of any one of the neuron circuits 10b1 to 10bn is updated, the router 30 is able to reflect the update on the neuron circuits 10b1 to 10bn.

For example, when the chip address of the ising device 2bk is set in the mode register 32 illustrated in FIG. 4 (when the ising device 2bk is brought in the talk mode), one of the states $x_1, \ldots, x_i, \ldots, x_n$ of the neuron circuits 10b1 to 10bn is allowed to be updated. The states $x_1$ to $x_n$ are supplied to the neuron circuits 10b1 to 10bn, along with the above states $x_{n+1}$ to $x_N$, as an update signal. In addition, as the internal address of the neuron circuit allowed to be updated, the random value rn outputted by the random signal generation circuit 14 is transmitted to the address bus 4b via the interface circuit 31. In addition, the state of the neuron circuit allowed to be updated is transmitted to the data bus 4a via the interface circuit 31.

(Example of Annealing Operation)

Hereinafter, an example of an operation (an annealing operation) of the information processing apparatus 1a controlled by the control device 3 will be described.

Figure 7:
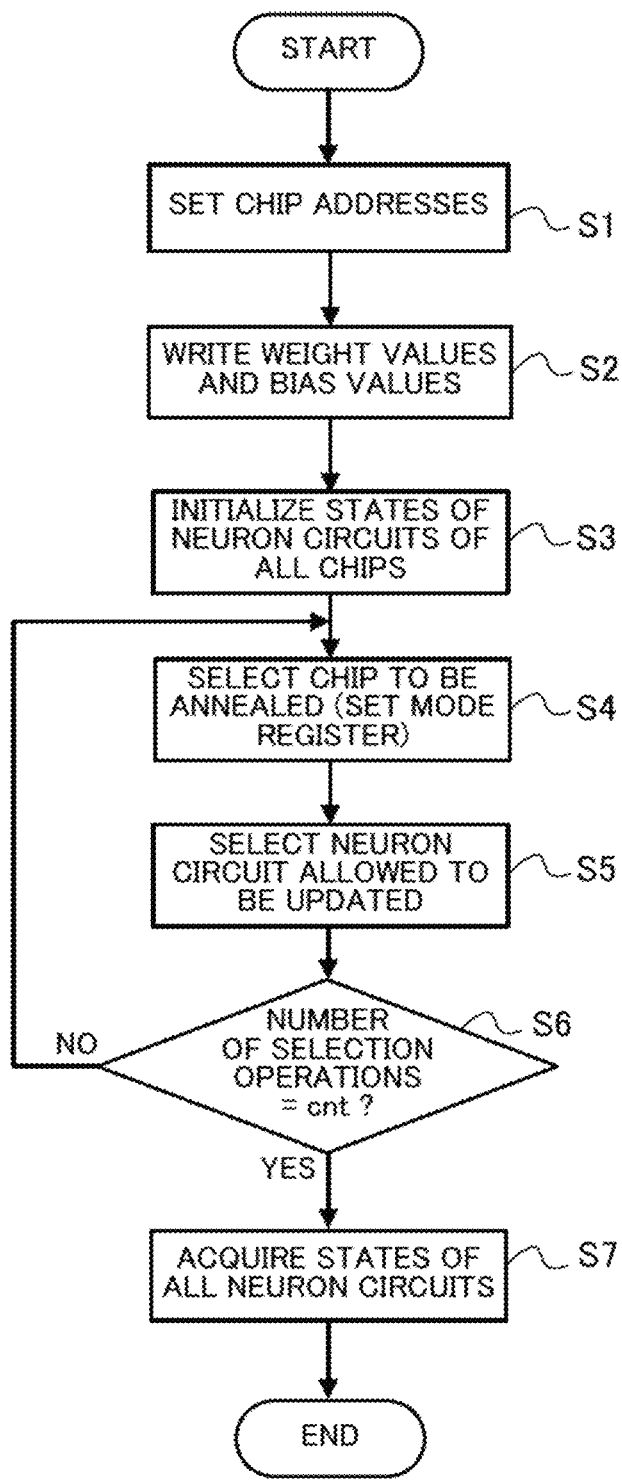
FIG. 7 is a flowchart illustrating an operation example of the information processing apparatus.

FIG. 7 is a flowchart illustrating an operation example of the information processing apparatus 1a.

First, the control device 3 sets a chip address in a register (for example, in the chip address register in FIG. 4) in each of the ising devices 2b1 to 2bm (step S1). These chip addresses may be set by using a scan chain, for example. In this case, an individual chip address register 35 includes scan flip flops, the number of which corresponds to the bit number of the corresponding chip address.

Next, on the basis of the problem to be calculated, the control device 3 writes (sets) weight values and bias values in registers (or memories) in the neuron circuits in the ising devices 2b1 to 2bm (step S2).

Figure 8:
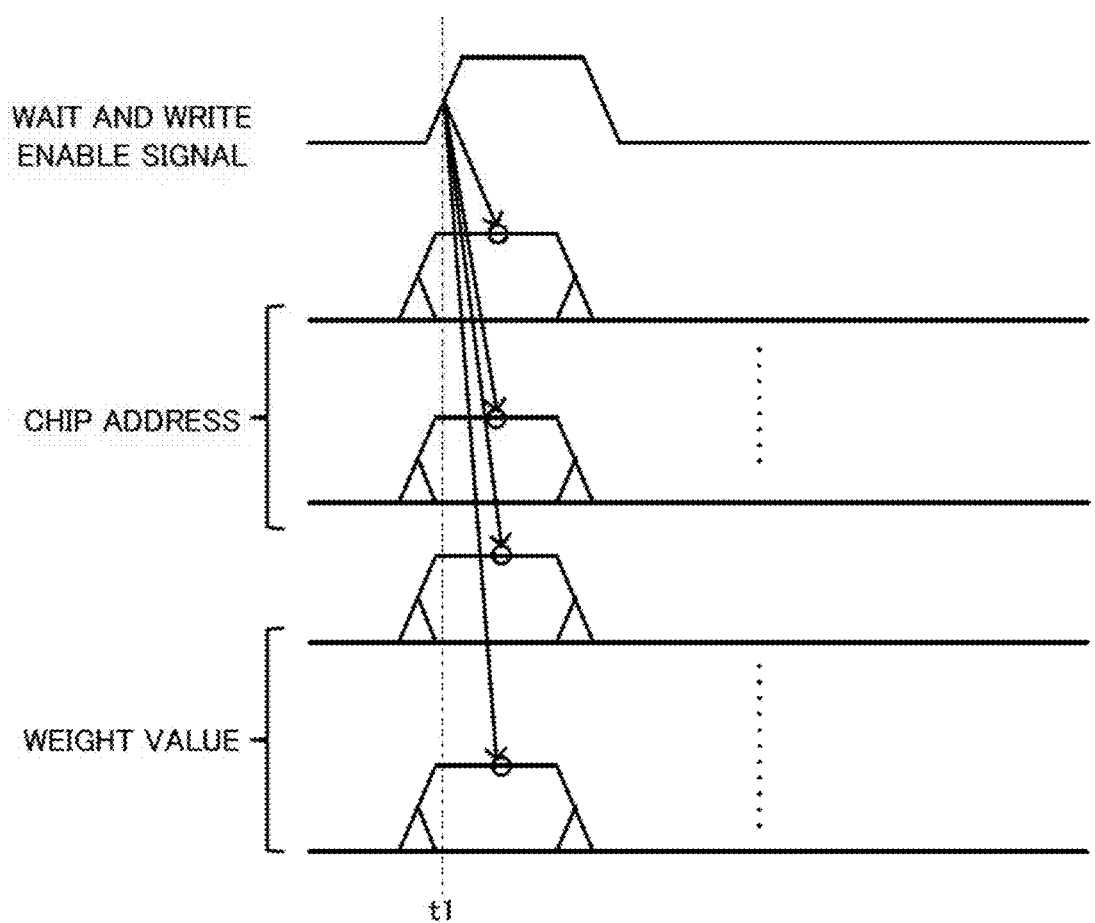
FIG. 8 is a timing chart illustrating an operation example performed when weight values are written.

FIG. 8 is a timing chart illustrating an operation example performed when the weight values are written.

When writing the weight values in the registers 20b1 to 20bn in the neuron circuits 10b1 to 10bn in the ising device 2bk, the control device 3 supplies the weight values and the chip address of the ising device 2bk to the data bus 4a and the control bus 4c. In addition, the control device 3 brings the logic level of a wait write enable signal transmitted via the control bus 4c to an H level.

In this operation, the interface circuit 31 in the router 30 compares the chip address transmitted via the control bus 4c with the chip address stored in the chip address register 35 in synchronization with a rising edge of a wait and write enable signal (timing t1).

If the two chip addresses match, the interface circuit 31 captures the weight values transmitted via the data bus 4a and writes the weight values in the registers 20b1 to 20bn via data lines (not illustrated).

The bias values $b_1$ to $b_n$ are written in the registers 24b1 to 24bn in the neuron circuits 10b1 to 10bn in the same way, respectively.

Weight values and bias values are written in registers (or memories) in the neuron circuits in the other ising devices in the same way.

Next, the control device 3 initializes the states of the neuron circuits of all the chips (the ising devices 2b1 to 2bn) (step S3). For example, the control device 3 resets the flip flops holding the states of the neuron circuits (for example, the flip flops 27b1 to 27bn in FIG. 3) via control signal lines (not illustrated). Next, by setting a chip address in a mode register via the control bus 4c, the control device 3 selects one of the ising devices 2b1 to 2bn. This selected ising device (a chip to be annealed) performs an annealing operation (set in the talk mode) (step S4).

The annealing operation is an operation of allowing updating of the state of a neuron circuit included in an ising device. For example, when an ising device having a certain chip address is annealed, this chip address is set in the mode registers in the other ising devices (for example, in the individual mode register 32 in FIG. 4). For example, the control device 3 randomly selects one of the chip addresses of the ising devices 2b1 to 2bn and supplies the selected chip address to the control bus 4c.

In the selected ising device, a single neuron circuit whose state is allowed to be updated is randomly selected (step S5).

The following description assumes that the control device 3 has selected the ising device 2bk in step S4. In step S5, on the basis of the random value rn outputted by the random signal generation circuit 14 illustrated in FIG. 3, one of the selection circuits 21b1 to 21bn in the neuron circuits 10b1 to 10bn outputs the corresponding weight values.

For example, when the selection circuit 21bi in the neuron circuit 10bi outputs the weight values $W_{i1}$ to $W_{iN}$, the local field value $h_i$ is calculated on the basis of the weight values $W_{i1}$ to $W_{iN}$ and the states $x_1$ to $x_N$. When a sum of the local field value $h_i$ and a noise value is larger than a threshold, the neuron circuit 10bi outputs 0 as the state $x_i$. When the sum is smaller than the threshold, the neuron circuit 10bi outputs 1 as the state $x_i$.

When the state $x_i$ of the neuron circuit 10bi changes, the change is transmitted by the above router (for example, the router 30) to the connection destination neuron circuits of the neuron circuit 10bi.

The control device 3 determines whether the number of operations of selecting a chip to be annealed has reached a predetermined number cnt (step S6). If the number of operations has not reached the predetermined number cnt, the processing returns to step S4.

Each time the control device 3 selects a chip to be annealed, the control device 3 controls the noise generation circuits (for example, the individual noise generation circuit 13) included in the ising devices 2b1 to 2bm to gradually drop the noise width. In this way, simulated annealing is performed.

In the ising device 2bk, for example, the noise generation circuit 13 generates a noise value such that a probability with which the output values of the comparator circuits 26b1 to 26bn represent 1 accords with a sigmoid function. For example, the noise generation circuit 13 generates a noise value such that a probability $P_i(h_i)$ with which the state $x_i$ of the neuron circuit 10bi represents 1 satisfies the relationship of the following expression (4).

$$P_i(h_i)=1/[1+\exp(-h_i/T)] \quad (4)$$

In expression (4), T represents an effective temperature.

A probability density function p(ns) of a noise value ns generated to obtain the probability $P_i(h_i)$ as illustrated in expression (4) is expressed by the following expression (5).

$$p(ns)=\exp(-h_i/T)/[1+\exp(-h_i/T)]^2 \quad (5)$$

Figure 9:
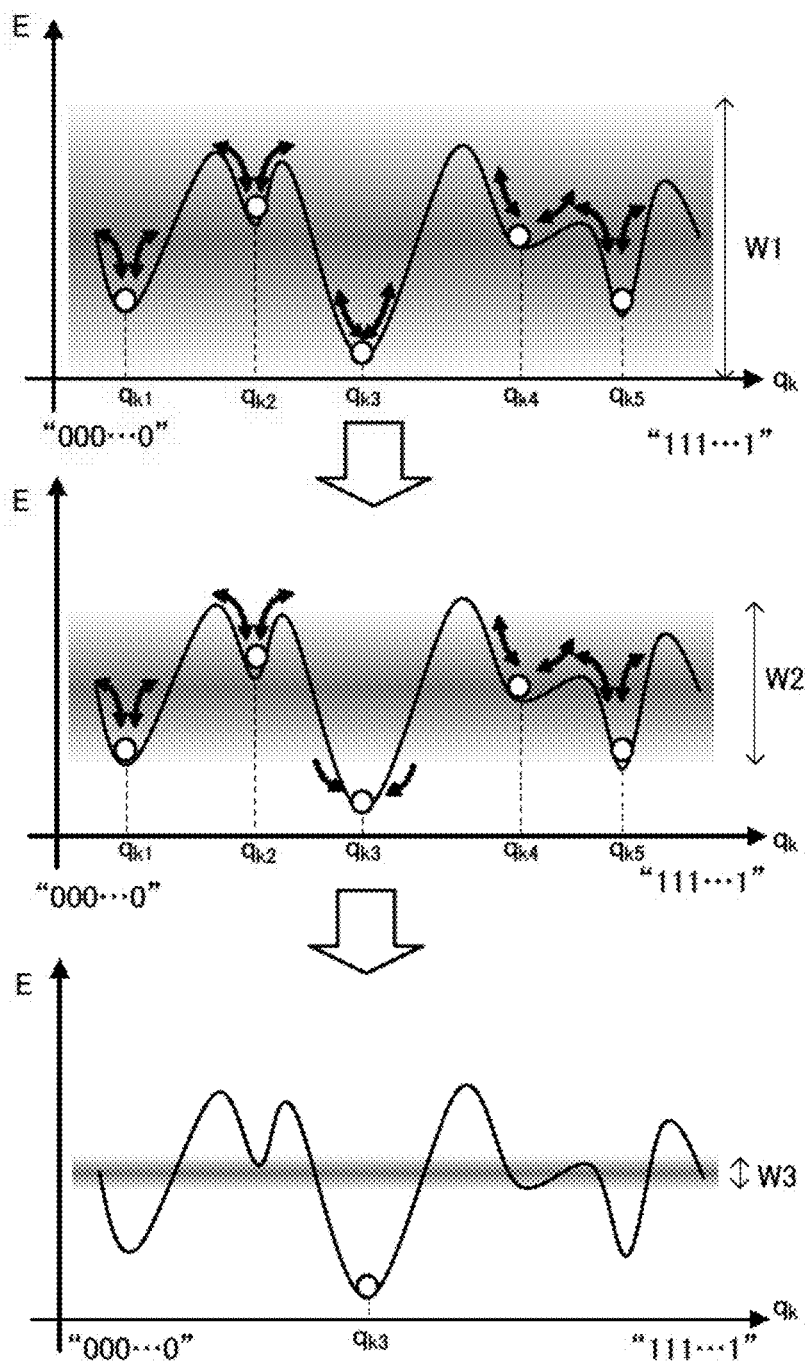
FIG. 9 illustrates progress of simulated annealing.

FIG. 9 illustrates progress of simulated annealing.

The vertical axis represents energy E, and the horizontal axis represents combinations $q_k$ of output values of all the neurons. The combinations $q_k$ are represented by "000 . . . 0" to "111 . . . 1". FIG. 9 illustrates how the convergence into an optimal solution is achieved as the noise width is dropped from W1 to W3. Dropping the noise width means dropping the effective temperature T in expression (5).

When the noise width is W1, even when an individual solution reaches a local solution $q_{k1}$, $q_{k2}$, $q_{k4}$, or $q_{k5}$ (a solution when the energy represents a local minimal value), the local solution may change in the direction of higher energy. Thus, these solutions may shift from the local solutions. As the noise width gradually drops to W2 and W3, the change of the individual solution is also gradually limited, and the convergence into an optimal solution $q_{k3}$ (a solution when the energy represents a minimum value) is finally achieved.

When the number of operations of selecting a chip to be annealed reaches the predetermined number cnt, the control device 3 determines that the changes of the states of all the neuron circuits have converged. As a result, the control device 3 acquires a combination of the states of all the neuron circuits as a solution (step S7) and ends the annealing operation.

The information processing apparatus 1a according to the second embodiment provides advantageous effects similar to those provided by the information processing apparatus 1 according to the first embodiment. Namely, each of the ising devices 2b1 to 2bm is able to reflect a received state of a neuron circuit in another ising device on its own neuron circuits on the basis of the corresponding connection destination information. In this way, the number of inter-neuron-circuit connections may be increased, and a large-scale operation may be performed.

In addition, the ising devices 2b1 to 2bm are formed by the same circuit configuration. In other words, different kinds of chips do not need to be prepared. In addition, since the ising devices 2b1 to 2bm are connected to each other to the common buses 4, no complex wiring is needed.

Third Embodiment

Figure 10:
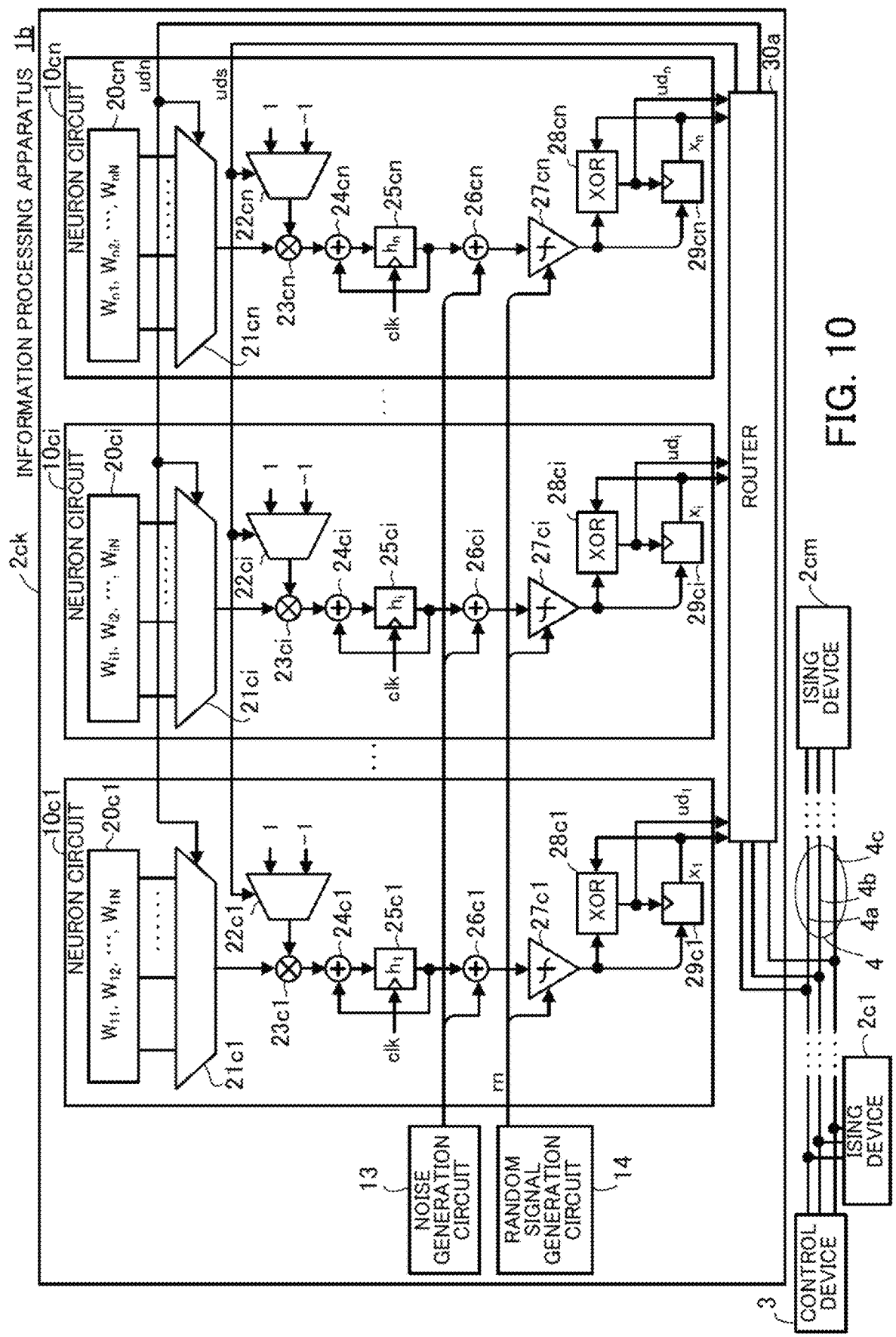
FIG. 10 illustrates an example of an information processing apparatus according to a third embodiment.

FIG. 10 illustrates an example of an information processing apparatus 1b according to a third embodiment. In FIG. 10, the elements in the information processing apparatus 1b that are equivalent to those in the information processing apparatus 1a according to the second embodiment are denoted by like reference characters.

The information processing apparatus 1b according to the third embodiment includes plural (m) ising devices 2c1 to 2cm including neuron circuits. These neuron circuits have a different circuit configuration from that of the neuron circuits in the information processing apparatus 1a according to the second embodiment.

FIG. 10 illustrates an example of a circuit configuration of the ising device 2ck. The ising device 2ck includes neuron circuits 10c1, . . . , 10ci, . . . , and 10cn, a noise generation circuit 13, a random signal generation circuit 14, and a router 30a.

The neuron circuits 10c1 to 10cn correspond to the neuron circuits 10a1 to 10an in the ising device 2ak according to the first embodiment. The router 30a corresponds to the router 12 in the ising device 2ak according to the first embodiment. The ising device 2ck according to the third embodiment will also be described, assuming that an element corresponding to the memory 11 according to the first embodiment is included in the router 30a, as will be described below.

The neuron circuits 10c1 to 10cn are circuits that operate on the basis of an algorithm referred to as a DeGloria algorithm.

FIG. 10 illustrates, as an example, only the neuron circuits 10c1, 10ci, and 10cn of the neuron circuits 10c1 to 10cn. The neuron circuits other than the neuron circuits 10c1, 10ci, and 10cn of the neuron circuits 10c1 to 10cn have the same circuit configuration.

The neuron circuit 10c1 includes a register 20c1, selection circuits 21c1 and 22c1, a multiplier circuit 23c1, an adder circuit 24c1, a register 25c1, an adder circuit 26c1, a comparator circuit 27c1, an XOR circuit 28c1, and a register 29c1. The neuron circuit 10ci includes a register 20ci, selection circuits 21ci and 22ci, a multiplier circuit 23ci, an adder circuit 24ci, a register 25ci, an adder circuit 26ci, a comparator circuit 27ci, an XOR circuit 28ci, and a register 29ci. The neuron circuit 10cn includes a register 20cn, selection circuits 21cn and 22cn, a multiplier circuit 23cn, an adder circuit 24cn, a register 25cn, an adder circuit 26cn, a comparator circuit 27cn, an XOR circuit 28cn, and a register 29cn.

Each of the registers 20c1, 20ci, and 20cn hold N weight values, as is the case with the registers 20b1, 20bi, and 20bn illustrated in FIG. 3.

The selection circuit 21c1 selects and outputs one of weight values $W_{11}$ to $W_{1N}$ stored in the registers 20c1 on the basis of a weight value selection signal udn supplied by the router 30a. The selection circuit 21ci selects and outputs one of weight values $W_{i1}$ to $W_{iN}$ stored in the registers 20ci on the basis of the selection signal udn supplied by the router 30a. The selection circuit 21cn selects and outputs one of weight values $W_{n1}$ to $W_{nN}$ stored in the registers 20cn on the basis of the selection signal udn supplied by the router 30a.

For example, the weight value selection signal udn is the internal address of an updated neuron circuit or a neuron index associated with an internal address in one of the above items of connection destination information 33a1 to 33an. Alternatively, the weight value selection signal udn may be a signal generated on the basis of such an internal address or a neuron index.

Each of the selection circuits 22c1 to 22cn selects and outputs 1 or −1 on the basis of the updated state (0 or 1) (which will hereinafter be referred to as an updated state uds) of a connection destination neuron circuit, the updated state uds being supplied by the router 30a. When an individual one of the selection circuits 22c1 to 22cn receives 0 as the updated state uds, the individual one of the selection circuits 22c1 to 22cn selects and outputs −1. When an individual one of the selection circuits 22c1 to 22cn receives 1 as the updated state uds, the individual one of the selection circuits 22c1 to 22cn selects and outputs 1. The reason will be described below.

The multiplier circuit 23c1 outputs a product of the value outputted by the selection circuit 21c1 and the value outputted by the selection circuit 22c1. The multiplier circuit 23ci outputs a product of the value outputted by the selection circuit 21ci and the value outputted by the selection circuit 22ci. The multiplier circuit 23cn outputs a product of the value outputted by the selection circuit 21cn and the value outputted by the selection circuit 22cn.

The adder circuit 24c1 outputs a sum of the value outputted by the multiplier circuit 23c1 and the value stored in the register 25c1. The adder circuit 24ci outputs a sum of the value outputted by the multiplier circuit 23ci and the value stored in the register 25ci. The adder circuit 24cn outputs a sum of the value outputted by the multiplier circuit 23cn and the value stored in the register 25cn.

In synchronization with a clock signal clk, the register 25c1 captures the value outputted by the adder circuit 24c1. In synchronization with the clock signal clk, the register 25ci captures the value outputted by the adder circuit 24ci. In synchronization with the clock signal clk, the registers 25cn captures the value outputted by the adder circuit 24cn. For example, the registers 25c1 to 25cn are flip flops. The initial values are the above bias values $b_i$ to $b_n$.

The values captured by the registers 25c1 to 25cn are the above local field values $h_1$ to $h_n$, respectively.

The adder circuit 26c1 adds a noise value outputted by the noise generation circuit 13 to the value outputted by the registers 25c1 and outputs the sum. The adder circuit 26ci adds the noise value outputted by the noise generation circuit 13 to the value outputted by the register 25ci and outputs the sum. The adder circuit 26cn adds the noise value outputted by the noise generation circuit 13 to the value outputted by the register 25cn and outputs the sum.

When the value outputted by the adder circuit 26c1 is larger than a threshold (for example, 0), the comparator circuit 27c1 outputs 0. When the value outputted by the adder circuit 26c1 is smaller than the threshold, the comparator circuit 27c1 outputs 1. When the value outputted by the adder circuit 26ci is larger than a threshold, the comparator circuit 27ci outputs 0. When the value outputted by the adder circuit 26ci is smaller than the threshold, the comparator circuit 27ci outputs 1. When the value outputted by the adder circuit 26cn is larger than a threshold, the comparator circuit 27cn outputs 0. When the value outputted by the adder circuit 26cn is smaller than the threshold, the comparator circuit 27cn outputs 1.

When the ising device 2ck is in a talk mode, one of the comparator circuits 27c1 to 27cn is randomly enabled by a random value rn outputted by the random signal generation circuit 14. The other comparator circuits are disabled. The disenabled comparator circuits do not perform the comparison operation. When the ising device 2ck is in a listen mode, all the comparator circuits 27c1 to 27cn are disabled.

When the value outputted by the comparator circuit 27c1 and the value stored in the register 29c1 match, the XOR circuit 28c1 outputs 0 as an update signal $ud_1$. Otherwise, the XOR circuit 28c1 outputs 1 as the update signal $ud_1$. When the value outputted by the comparator circuit 27ci and the value stored in the register 29ci match, the XOR circuit 28ci outputs 0 as an update signal $ud_i$. Otherwise, the XOR circuit 28ci outputs 1 as the update signal $ud_i$. When the value outputted by the comparator circuit 27cn and the value stored in the register 29cn match, the XOR circuit 28cn outputs 0 as an update signal $ud_n$. Otherwise, the XOR circuit 28cn outputs 1 as the update signal $ud_n$.

When the update signal $ud_1$ is 1, the register 29c1 captures the value outputted by the comparator circuit 27c1. As a result, the state $x_1$ of the neuron circuit 10c1 is changed (updated). When the update signal $ud_i$ is 1, the register 29ci captures the value outputted by the comparator circuit 27ci. As a result, the state $x_i$ of the neuron circuit 10ci is changed. When the update signal $ud_n$ is 1, the register 29cn captures the value outputted by the comparator circuit 27cn. As a result, the state $x_n$ of the neuron circuit 10cn is changed.

Among the neuron circuits, only one neuron circuit is allowed to be updated at a time. Thus, an individual neuron circuit connected to this neuron circuit simply needs to add or subtract the amount of the change made by the updating to or from the corresponding original local field value. When the state of a connection destination neuron circuit is updated, the neuron circuits 10c1 to 10cn in FIG. 10 update their respective local field values by adding or subtracting the amount of the change made by the updating to or from their respective local field values.

For example, when the state $x_j$ (0 or 1) of a neuron circuit connected to the neuron circuit 10ci has changed to $1-x_j$, the change amount $\Delta h_i$ of the local field value $h_i$ of the neuron circuit 10ai is expressed by the following expression (6).

$$\Delta h_i = h_i|_{x_j = 1 - x_j} - h_i = W_{ij}(1 - 2x_j) \quad (6)$$

In expression (6), $1-2x_j$ represents +1 when the state $x_j$ changes from 0 to 1 and represents −1 when the state $x_j$ changes from 1 to 0.

This operation of $1-2x_j$ is realized by the selection circuit 22ci illustrated in FIG. 10. In addition, the multiplier circuit 23ci multiplies the weight value $W_{ij}$ with the value outputted by the selection circuit 22ci, to calculate the change amount $\Delta h_i$ of the local field value $h_i$.

(Example of Router 30a)

Figure 11:
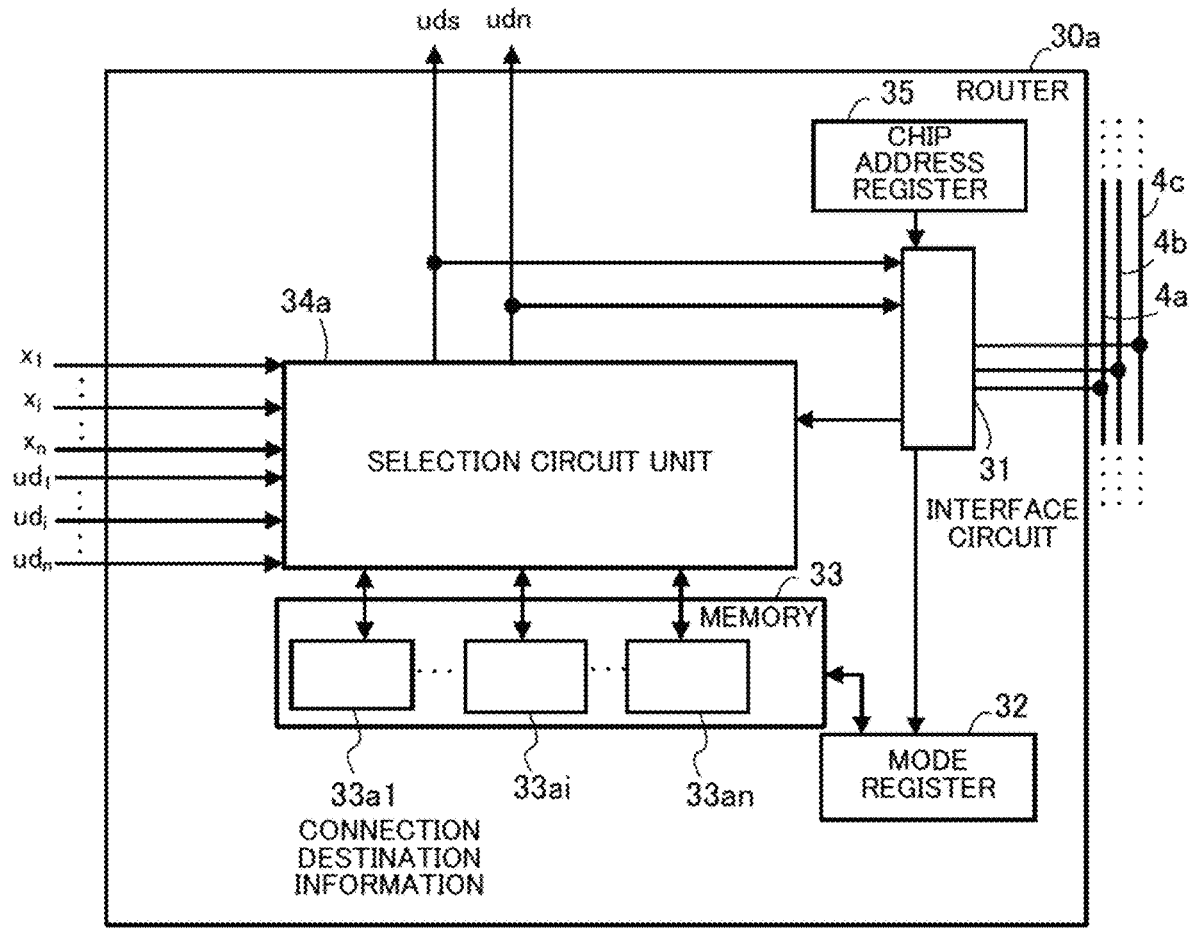
FIG. 11 illustrates an example of a router.

FIG. 11 illustrates an example of a router. In FIG. 11, the elements in the router 30a that are equivalent to those in the router 30 according to the second embodiment in FIG. 4 are denoted by like reference characters.

The router 30a includes a selection circuit unit 34a having a function different from that of the selection circuit unit 34 in the router 30.

The selection circuit unit 34a receives states $x_1$ to $x_n$ and update signals $ud_1$ to $ud_n$ from the neuron circuits 10c1 to 10cn in the ising device 2ck. When the chip address of the ising device 2ck is set in the mode register 32 (when the ising device 2ck is brought in the talk mode), there is a chance that one of the update signals $ud_1$ to $ud_n$ could be set to 1. The selection circuit unit 34a outputs the internal address of one of the neuron circuits 10c1 to 10cn that outputs the update signal (one of $ud_1$ to $ud_n$) representing 1 as a selection signal udn and outputs the state of this neuron circuit as an updated state uds.

For example, when the update signal $ud_i$ outputted by the neuron circuit 10ci is 1, the selection circuit unit 34a outputs i, which is the internal address of the neuron circuit 10ci, as the selection signal udn, and the state $x_i$ as the updated state uds.

The selection circuit unit 34a supplies the updated state uds and the selection signal udn to the neuron circuits 10c1 to 10cn in the ising device 2ck. In addition, the interface circuit 31 supplies the updated state uds and the selection signal udn to the other ising devices via the data bus 4a and the address bus 4b.

In addition, when the ising device 2ck is in the listen mode, the selection circuit unit 34a receives the state and the internal address of a neuron circuit included in another ising device via the interface circuit 31, the data bus 4a, and the address bus 4b.

When the internal address that the selection circuit unit 34a has received via the interface circuit 31 matches an internal address read from the memory 33, the neuron circuit having the received internal address is a connection destination neuron circuit of at least one of the neuron circuits 10c1 to 10cn. Thus, the selection circuit unit 34a captures the received state of the connection destination neuron circuit. The selection circuit unit 34a supplies the neuron index associated with the received internal address as the selection signal udn and the received state of the connection destination neuron circuit as the updated state uds to the at least one of the neuron circuits 10c1 to 10cn connected to the connection destination neuron circuit.

Figure 12:
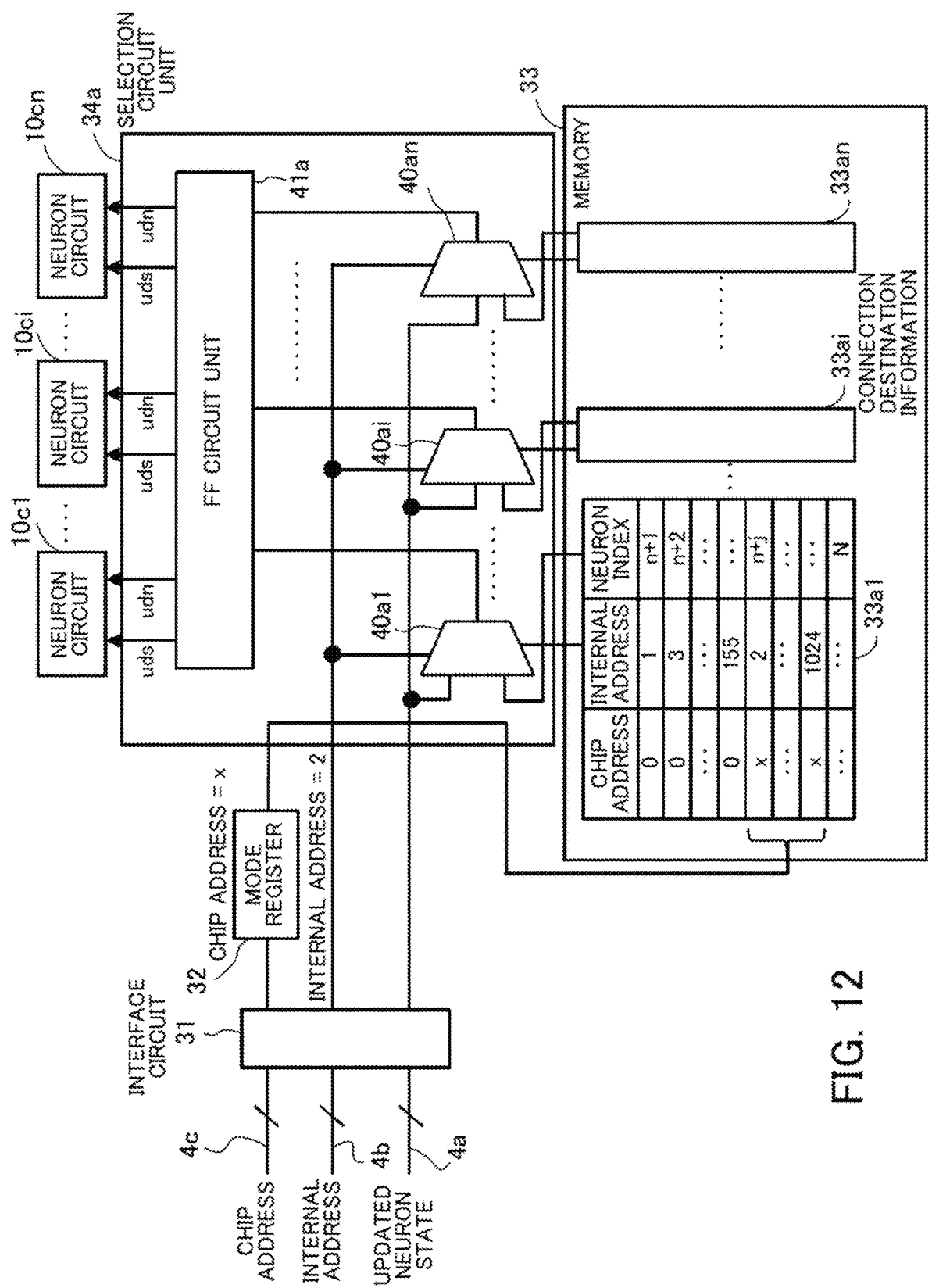
FIG. 12 illustrates an example of a selection circuit unit and of connection destination information.

FIG. 12 illustrates an example of a selection circuit unit and of connection destination information.

FIG. 12 illustrates an example of a part of the selection circuit unit 34a that functions when the ising device 2ck is in the listen mode. In FIG. 12, the elements in the selection circuit unit 34a that are equivalent to those in the selection circuit unit 34 illustrated in FIG. 5 are denoted by like reference characters.

The selection circuit unit 34a has an FF circuit unit 41a that functions differently from the FF circuit unit 41 in the selection circuit unit 34.

The FF circuit unit 41a outputs the state of a connection destination neuron circuit outputted by one of the selection circuits 40a1 to 40an as the updated state uds and the neuron index of the connection destination neuron circuit outputted by the corresponding one of the selection circuits 40a1 to 40an as the selection signal udn.

When the state of any one of the connection destination neuron circuits of the neuron circuits 10c1 to 10cn is changed, the router 30a is able to reflect the change on the neuron circuits 10c1 to 10cn.

Since the operation (annealing operation) performed by the information processing apparatus 1b controlled by the control device 3 is the same as that performed by the information processing apparatus 1a illustrated in FIG. 7, redundant description will be omitted.

The above information processing apparatus 1b according to the third embodiment also provides advantageous effects similar to those provided by the information processing apparatus 1a according to the second embodiment.

Each of the neuron circuits 10c1 to 10cn in the information processing apparatus 1b according to the third embodiment calculates the amount of change of the corresponding local field value and updates the local field value on the basis of the change amount. Thus, the neuron circuits 10c1 to 10cn in the information processing apparatus 1b according to the third embodiment need fewer adder circuits and multiplier circuits than those used in the neuron circuits 10b1 to 10bn in the information processing apparatus 1a according to the second embodiment. Consequently, the third embodiment needs a smaller circuit area.

While an aspect of the information processing apparatus, an aspect of the ising device, and an aspect of the control method for the information processing apparatus have been described on the basis of the above embodiments, the above embodiments are only examples. The present technique is not limited to the above embodiments.

In one aspect, it is possible to calculate a large-scale problem using relatively many variables.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a plurality of ising devices connected to common buses; and
a processor,
each of the plurality of ising devices includes:
a plurality of neuron circuits, each of which calculates a first value based on a sum of values, each of which is obtained by multiplying an output signal of one of a plurality of connection destination neuron circuits by one of a plurality of weight values that indicate connection strength with the respective connection destination neuron circuits, outputs 0 or 1 in accordance with a result of comparison between a second value obtained by adding a noise value to the first value and a threshold, and updates, upon receiving an update signal when one of the output signals changes, the first value in accordance with the update signal,
a memory that holds items of connection destination information for each of the plurality of neuron circuits, each of the items of connection destination information including items of first address information identifying each of the plurality of connection destination neuron circuits and an item of second address information identifying, among the plurality of ising devices, a first ising device including at least one of the plurality of connection destination neuron circuits, the first and second address information being associated with each other, and
a router that supplies, when a first output signal of a first connection destination neuron circuit among the plurality of connection destination neuron circuits that is included in the first ising device changes and when the router receives the first address information identifying the first connection destination neuron circuit via one of the buses, the update signal based on a value of the changed first output signal transmitted via one of the buses to one of the plurality of neuron circuits in accordance with the received first address information, previously specified second address information identifying the first ising device, and the connection destination information, and
the processor specifies the second address information identifying the first ising device including the first connection destination neuron circuit that allows change of the first output signal, and
a certain neuron circuit among the plurality of neuron circuits included in the first ising device connects with all of the plurality of neuron circuits included in the first ising device other than the certain neuron circuit and connects with a part of the plurality of neuron circuits included in a second ising device of the plurality of ising devices, and the certain neuron circuit does not connect with other part of the plurality of neuron circuits included in the second ising device, and a first number is greater than a second number, the first number indicates a number of the neuron circuits included in the first ising device and connected with the certain neuron circuit, and the second number indicates a number of the neuron circuits included in the second ising device and connected with the certain neuron circuit, the router in a certain ising device of the plurality of ising devices compares the received first address information and the previously specified second address information identifying the first ising device with each of the items of connection destination information, the router in the certain ising device supplies the update signal to one of the plurality of neuron circuits in the certain ising device when the received first address information and the previously specified second address information are included in one of the items of connection destination information, and the router in the certain ising device keeps the output signal of the one of the plurality of neuron circuits when the received first address information and the previously specified second address information are not included in the one of the items of connection destination information.

2. The information processing apparatus according to claim 1, wherein, when the first output signal of the first connection destination neuron circuit changes, the router included in the first ising device supplies the changed value of the first output signal and the first address information identifying the first connection destination neuron circuit to the buses.

3. The information processing apparatus according to claim 1, wherein each of the plurality of ising devices includes a storage unit holding a same second address information specified by the processor.

4. The information processing apparatus according to claim 1, wherein the second ising device includes a memory in which the connection destination information is stored, and in the connection destination information, the first address information identifying the first connection destination neuron circuit included in the first ising device is associated with identification information, which identifies the first connection destination neuron circuit, used inside the second ising device.

5. The information processing apparatus according to claim 1, wherein a plurality of connection destination neuron circuits of a plurality of neuron circuits arranged in a third ising device among the plurality of ising devices include a plurality of second connection destination neuron circuits of the plurality of neuron circuits included in the third ising device and a plurality of third connection destination neuron circuits included in one or a plurality of fourth ising devices among the plurality of ising devices, and a number of the third connection destination neuron circuits is less than a number of the second connection destination neuron circuits.

6. An ising device comprising:

a plurality of neuron circuits, each of which calculates a first value based on a sum of values, each of which is obtained by multiplying an output signal of one of a plurality of connection destination neuron circuits by one of a plurality of weight values that indicate connection strength with the respective connection destination neuron circuits, outputs 0 or 1 in accordance with a result of comparison between a second value obtained by adding a noise value to the first value and a threshold, and updates, upon receiving an update signal when one of the output signals changes, the first value in accordance with the update signal;

a memory that holds items of connection destination information for each of the plurality of neuron circuits, each of the items of connection destination information including items of first address information identifying each of the plurality of connection destination neuron circuits and an item of second address information identifying, among a plurality of ising devices connected to common buses, a first ising device including at least one of the plurality of connection destination neuron circuits, the first and second address information being associated with each other; and a router that supplies, when a first output signal of a first connection destination neuron circuit among the plurality of connection destination neuron circuits that is included in the first ising device changes and when the router receives the first address information identifying the first connection destination neuron circuit via one of the buses, the update signal based on a value of the changed first output signal transmitted via one of the buses to one of the plurality of neuron circuits in accordance with the received first address information, previously specified second address information identifying the first ising device, and the connection destination information, a certain neuron circuit among the plurality of neuron circuits included in the ising device connects with all of the plurality of neuron circuits included in the ising device other than the certain neuron circuit and connects with a part of the plurality of neuron circuits included in the first ising device, and the certain neuron circuit does not connect with other part of the plurality of neuron circuits included in the first ising device, and a first number is greater than a second number, the first number indicates a number of the neuron circuits included in the ising device and connected with the certain neuron circuit, and the second number indicates a number of the neuron circuits included in the first ising device and connected with the certain neuron circuit, the router compares the received first address information and the previously specified second address information identifying the first ising device with each of the items of connection destination information, the router supplies the update signal to one of the plurality of neuron circuits in the ising device when the received first address information and the previously specified second address information are included in one of the items of connection destination information, and the router keeps the output signal of the one of the plurality of neuron circuits when the received first address information and the previously specified second address information are not included in the one of the items of connection destination information.

7. A control method for an information processing apparatus, the control method comprising:

preparing a plurality of ising devices, each of which includes a plurality of neuron circuits, each of which calculates a first value based on a sum of values, each of which is obtained by multiplying an output signal of one of a plurality of connection destination neuron circuits by one of a plurality of weight values that indicate connection strength with the respective connection destination neuron circuits, outputs 0 or 1 in accordance with a result of comparison between a second value obtained by adding a noise value to the first value and a threshold, and updates, upon receiving an update signal when one of the output signals changes, the first value in accordance with the update signal, a memory that holds items of connection destination information for each of the plurality of neuron circuits, each of the items of connection destination information including items of first address information identifying each of the plurality of connection destination neuron circuits and an item of second address information identifying, among a plurality of ising devices connected to common buses, a first ising device including at least one of the plurality of connection destination neuron circuits, the first and second address information being associated with each other, and a router that supplies, when a first output signal of a first connection destination neuron circuit among the plurality of connection destination neuron circuits that is included in the first ising device changes and when the router receives the first address information identifying the first connection destination neuron circuit via one of the buses, the update signal based on a value of the changed first output signal transmitted via one of the buses to one of the plurality of neuron circuits in accordance with the received first address information, previously specified second address information identifying the first ising device, and the connection destination information; and specifying, by a control device, the second address information identifying the first ising device including the first connection destination neuron circuit that allows change of the first output signal, a certain neuron circuit among the plurality of neuron circuits included in the first ising device connects with all of the plurality of neuron circuits included in the first ising device other than the certain neuron circuit and connects with a part of the plurality of neuron circuits included in a second ising device of the plurality of ising devices, and the certain neuron circuit does not connect with other part of the plurality of neuron circuits included in the second ising device, and a first number is greater than a second number, the first number indicates a number of the neuron circuits included in the first ising device and connected with the certain neuron circuit, and the second number indicates a number of the neuron circuits included in the second ising device and connected with the certain neuron circuit, the router in a certain ising device of the plurality of ising devices compares the received first address information and the previously specified second address information identifying the first ising device with each of the items of connection destination information, the router in the certain ising device supplies the update signal to one of the plurality of neuron circuits in the certain ising device when the received first address information and the previously specified second address information are included in one of the items of connection destination information, and the router in the certain ising device keeps the output signal of the one of the plurality of neuron circuits when the received first address information and the previously specified second address information are not included in the one of the items of connection destination information.

8. The information processing apparatus according to claim 1, wherein a certain neuron circuit included in the first ising device of the plurality of ising devices connects to each of the plurality of neuron circuits included in the first ising device and at least one of the plurality of neuron circuits included in the second ising device of the plurality of ising devices, and the first address information identifies each of the plurality of neuron circuits included in the first ising device and the at least one of the neuron circuits included in the second ising device.

9. The ising device according to claim 6, wherein a certain neuron circuit included in the first ising device of the plurality of ising devices connects to each of the plurality of neuron circuits included in the first ising device and at least one of the plurality of neuron circuits included in a second ising device of the plurality of ising devices, and the first address information identifies each of the plurality of neuron circuits included in the first ising device and the at least one of the neuron circuits included in the second ising device.

10. The control method for the information processing apparatus according to claim 7, wherein a certain neuron circuit included in the first ising device of the plurality of ising devices connects to each of the plurality of neuron circuits included in the first ising device and at least one of the plurality of neuron circuits included in the second ising device of the plurality of ising devices, and the first address information identifies each of the plurality of neuron circuits included in the first ising device and the at least one of the neuron circuits included in the second ising device.

11. The information processing apparatus according to claim 1, wherein a number of the plurality of connection destination neuron circuits is less than a total number of the plurality of neuron circuits included in the plurality of ising devices.

12. The ising device according to claim 6, wherein a number of the plurality of connection destination neuron circuits is less than a total number of the plurality of neuron circuits included in the plurality of ising devices.

13. The control method for the information processing apparatus according to claim 7, wherein a number of the plurality of connection destination neuron circuits is less than a total number of the plurality of neuron circuits included in the plurality of ising devices.

* * * * *